(12) United States Patent
Freishtat et al.

(10) Patent No.: US 10,607,235 B2
(45) Date of Patent: Mar. 31, 2020

(54) SYSTEMS AND METHODS FOR CURATING CONTENT

(75) Inventors: Gregg S. Freishtat, Atlanta, GA (US); Paul Edward Kaib, Atlanta, GA (US)

(73) Assignee: Outbrain Inc., New York, NY (US)

( * ) Notice: Subject to any disclaimer, the term of this patent is extended or adjusted under 35 U.S.C. 154(b) by 0 days.

(21) Appl. No.: 12/965,417

(22) Filed: Dec. 10, 2010

(65) Prior Publication Data

US 2011/0202827 A1 Aug. 18, 2011

Related U.S. Application Data

(63) Continuation-in-part of application No. 12/647,304, filed on Dec. 24, 2009.

(51) Int. Cl.
*G06F 17/00* (2019.01)
*G06Q 30/02* (2012.01)
(Continued)

(52) U.S. Cl.
CPC .......... *G06Q 30/02* (2013.01); *G06F 16/958* (2019.01); *G06F 16/972* (2019.01); *H04L 67/025* (2013.01); *H04L 67/22* (2013.01)

(58) Field of Classification Search
CPC ....... H04L 67/02; H04L 67/22; H04L 67/025; G06F 17/3089; G06F 17/30873; G06F 17/30899; G06F 17/30905; G06F 21/10; G06F 17/211; G06F 17/30867; G06F 16/958; G06F 16/972; H04N 21/4622; H04N 21/4782; Y10S 707/99933; G06Q 30/02
USPC ....... 715/209, 239, 255, 749, 781, 826, 834, 715/201, 205–208, 229–230, 234–235, 715/243, 273, 716, 733, 736, 738, 715/744–745, 747, 753, 760, 762, 764, 715/791, 810, 835, 838, 853–854;
(Continued)

(56) References Cited

U.S. PATENT DOCUMENTS 5,953,718 A 9/1999 Wical
6,665,658 B1 12/2003 DaCosta et al.
(Continued)

FOREIGN PATENT DOCUMENTS

JP 2008-225781 9/2008
KR 10-2002-0018321 3/2002
KR 10-2003-0003396 1/2003

OTHER PUBLICATIONS

Basu, S.,"Ditching Evernote? Check Out 5 Free Web Clipping Alternatives," © Mar. 24, 2010, downloaded from <"http://www.makeuseof.com/tag/ditching-evernote-check-5-free-web-clipping-alternatives/">, 9 pages.*

(Continued)

*Primary Examiner* — Cesar B Paula
*Assistant Examiner* — James H. Blackwell
(74) *Attorney, Agent, or Firm* — Lowenstein Sandler LLP

(57) ABSTRACT

Systems and methods for curating content. In one embodiment, a method for curating content from a set of third party webpages can be provided. The method can include aggregating content from the third party webpages, receiving an indication that content from one or more of the third party webpages has been selected, receiving an indication of a selected interface position for at least a portion of the selected content, and outputting an interface with the portion of selected content in the selected interface position.

10 Claims, 29 Drawing Sheets

(51) Int. Cl.
*H04L 29/08* (2006.01)
*G06F 16/958* (2019.01)

(58) Field of Classification Search
USPC ........ 709/203, 217–219, 224–225, 239, 216,
709/245–246; 707/999.001, 999.005,
707/E17.107, E17.108, E17.109, E17.111,
707/E17.116, E17.117, E17.121;
705/14.73, 26.1
See application file for complete search history.

(56) References Cited

U.S. PATENT DOCUMENTS

| | | | |
|---|---|---|---|
| 6,839,680 B1 | 1/2005 | Liu et al. | |
| 7,702,635 B2 * | 4/2010 | Horvitz et al. | 709/203 |
| 7,730,509 B2 | 6/2010 | Boulet et al. | |
| 7,752,190 B2 | 7/2010 | Skinner | |
| 7,814,089 B1 * | 10/2010 | Skrenta et al. | 707/709 |
| 7,877,290 B1 * | 1/2011 | Arsenault | G06Q 30/0241 |
| | | | 705/14.4 |
| 8,146,126 B2 | 3/2012 | Downey et al. | |
| 8,271,495 B1 * | 9/2012 | Skrenta et al. | 707/738 |
| 2003/0023715 A1 | 1/2003 | Reiner et al. | |
| 2003/0171977 A1 | 9/2003 | Singh et al. | |
| 2004/0070627 A1 * | 4/2004 | Shahine | G06F 16/9038 |
| | | | 715/794 |
| 2004/0153373 A1 * | 8/2004 | Song et al. | 705/26 |
| 2004/0199491 A1 | 10/2004 | Bhatt | |
| 2004/0216034 A1 * | 10/2004 | Lection et al. | 715/500.1 |
| 2004/0255003 A1 * | 12/2004 | Tecu | G06F 17/30902 |
| | | | 709/217 |
| 2005/0065777 A1 | 3/2005 | Dolan et al. | |
| 2005/0080780 A1 | 4/2005 | Colledge et al. | |
| 2005/0154746 A1 * | 7/2005 | Liu et al. | 707/101 |
| 2005/0198020 A1 | 9/2005 | Garland et al. | |
| 2006/0010029 A1 | 1/2006 | Gross | |
| 2006/0041553 A1 | 2/2006 | Paczkowski et al. | |
| 2006/0041843 A1 * | 2/2006 | Billsus et al. | 715/714 |
| 2007/0027770 A1 | 2/2007 | Collins et al. | |
| 2007/0027865 A1 | 2/2007 | Bartz et al. | |
| 2007/0043744 A1 * | 2/2007 | Carro | G06F 17/30265 |
| 2007/0061313 A1 | 3/2007 | Kahle et al. | |
| 2007/0094250 A1 | 4/2007 | Kapur | |
| 2007/0100811 A1 | 5/2007 | Error et al. | |
| 2007/0112838 A1 * | 5/2007 | Bjarnestam | G06F 17/30038 |
| 2007/0162379 A1 | 7/2007 | Skinner | |
| 2007/0226614 A1 * | 9/2007 | Lorenzen et al. | 715/530 |
| 2008/0056574 A1 * | 3/2008 | Heck | G06F 17/2765 |
| | | | 382/177 |
| 2008/0059453 A1 | 3/2008 | Laderman | |
| 2008/0071929 A1 * | 3/2008 | Motte et al. | 709/246 |
| 2008/0086741 A1 | 4/2008 | Feldman et al. | |
| 2008/0114739 A1 | 5/2008 | Hayes | |
| 2008/0189408 A1 | 8/2008 | Cancel et al. | |
| 2008/0195954 A1 * | 8/2008 | Dharmarajan et al. | 715/749 |
| 2008/0221987 A1 | 9/2008 | Sundaresan et al. | |
| 2008/0235106 A1 | 9/2008 | Reisman | |
| 2008/0243812 A1 | 10/2008 | Chien et al. | |
| 2009/0024915 A1 * | 1/2009 | Cudich et al. | 715/234 |
| 2009/0112974 A1 | 4/2009 | Ravikumar et al. | |
| 2009/0129377 A1 | 5/2009 | Chamberlain et al. | |
| 2009/0158342 A1 | 6/2009 | Mercer et al. | |
| 2009/0164949 A1 * | 6/2009 | Henkin | G06Q 30/02 |
| | | | 715/862 |
| 2009/0313536 A1 * | 12/2009 | Karidi et al. | 715/209 |
| 2010/0017289 A1 * | 1/2010 | Sah | G06Q 30/02 |
| | | | 705/14.49 |
| 2010/0030597 A1 | 2/2010 | Lewis et al. | |
| 2010/0037168 A1 * | 2/2010 | Thayne | G06F 17/24 |
| | | | 715/769 |
| 2010/0241951 A1 * | 9/2010 | Vandervort et al. | 715/239 |
| 2011/0213655 A1 | 9/2011 | Henkin et al. | |
| 2011/0238495 A1 | 9/2011 | Kang | |
| 2011/0246601 A1 | 10/2011 | Murray et al. | |
| 2011/0289143 A1 | 11/2011 | Polis et al. | |
| 2012/0066581 A1 * | 3/2012 | Spalink | G06F 17/30716 |
| | | | 715/232 |
| 2012/0117484 A1 * | 5/2012 | Convertino | G06F 17/30864 |
| | | | 715/744 |

OTHER PUBLICATIONS

Red Oak,"Web Clipper datasheet," © 2006, Red Oak Software, Inc., 2 pages.*
Lingam et al.,"Supporting End-Users in the Creation of Dependable Web Clips," WWW 2007, May 8-12, ACM, pp. 953-962.*
Irmak et al.,"Interactive Wrapper Generation with Minimal User Effort," in WWW2003, May 20-24, 2003, ACM, 2 pages.*
Kuhlins et al.,"Toolkits for Generating Wrappers, A survey of software toolkits for automated data extraction from web sites," © 2002, pp. 1-15.*
Freire et al.,"WebViews: Accessing Personalized Web Content and Services," © 2001, ACM, pp. 576-586.*
Huck et al.,"Jedi: Extracting and Synthesizing Information from the Web," © 1998 in Intl. Conf. of Cooperative Info. Systems, 10 pages.*
Kowalkiewicz et al.,"Towards more personalized Web: Extraction and integration of dynamic content from the Web," © 2006, in Asia Pacific Web Conference, 12 pages.*
Fujima et al.,"Clip, Connect, Clone: Combining Application Elements to Build Custom Interfaces for Information Access," © 2004, ACM, pp. 175-184.*
Sahuguet et al.,"Building light-weight wrappers for legacy Web data-sources using W4F," © 1999 Proc. 25$^{th}$ VLDB Conf. 4 pages.*
Laender et al.,"A Brief Survey of Web Data Extraction Tools," © Jun. 2002, Sigmod Record, vol. 31, No. 2, pp. 84-93.*
Sugiura et al.,"Internet Scrapbook: Automating Web Browsing Tasks by Demonstration," © 1998, ACM, pp. 9-18.*
Yang, S. et al.,"A Content Provider-Specified Web Clipping Approach for Mobile Content Adaptation," in Mobile HCI 2002, LNCS 2411, pp. 324-328.*
Gangadharan, G.R. et al.,"Exploring the Intellectual Rights in the Mashup Ecosystem," in Proc. 6th Int. Workshop for Technical, Economic and Legal Aspects of Business Models for Virtual Goods, © 2008, pp. 13-22.*
Hasan, R. et al.,"Please Permit Me: Stateless Delegated Authorization in Mashups," © 2008, IEEE, pp. 173-182.*
Berendt, B. et al.,"From Web to Social Web: Discovering and Deploying User and Content Profiles," Workshop on Web Mining, WebMine 2006, Berlin, Germany, Sep. 18, 2006, Revised Selected and Invited Papers, Springer-Verlog Berlin 2007, 161 pages.*
Billsus, D. et al.,"Improving Proactive Information Systems," IUI'05, Jan. 9-12, 2005, San Diego, Cal., © 2005 ACM, 8 pages.*
Hilbert, D.M. et al.,"Seamless Capture and Discovery for Corporate Memory," WWW '06, May 22-26, 2006, 10 pages.*
Trevor, J. et al.,"Contextual Contact Retrieval," IUI'04, Jan. 13-16, 2004, Madeira, Funchal, Portugal, ACM, 3 pages.*
Unknown author,Help page for Links in MediaWiki by MediaWiki. org, © 2007, retrieved from marchive.org (WayBack Machine), 2 pages.*
PCT International Search Report for International application No. PCT/US2010/043925 dated Mar. 22, 2011, 3 pages.
USPTO Office Action for U.S. Appl. No. 12/965,427 dated Oct. 4, 2012.
USPTO Office Action for U.S. Appl. No. 12/965,440 dated Mar. 12, 2013.
USPTO Office Action for U.S. Appl. No. 12/367,968 dated May 11, 2011.
USPTO Office Action for U.S. Appl. No. 12/367,968 dated Oct. 14, 2011.
USPTO Office Action for U.S. Appl. No. 12/367,968 dated Apr. 24, 2012.
USPTO Office Action for U.S. Appl. No. 12/367,968 dated Feb. 4, 2013.
USPTO Office Action for U.S. Appl. No. 12/647,304 dated Apr. 4, 2012.

(56) References Cited

OTHER PUBLICATIONS

USPTO Office Action for U.S. Appl. No. 12/647,304 dated Jul. 5, 2012.
USPTO Office Action for U.S. Appl. No. 12/647,304 dated Apr. 12, 2013.
USPTO Office Action for U.S. Appl. No. 12/965,440 dated Mar. 13, 2013.
USPTO Office Action for U.S. Appl. No. 12/965,455 dated Jun. 29, 2012.
USPTO Office Action for U.S. Appl. No. 12/965,455 dated Apr. 24, 2013.

* cited by examiner

SYSTEMS AND METHODS FOR CURATING CONTENT

RELATED APPLICATION

This application is a continuation-in-part to U.S. application Ser. No. 12/647,304, filed on Dec. 24, 2009, entitled "Systems and Methods for Providing Targeted Content to a Network User," the contents of which are hereby incorporated by reference.

FIELD OF THE INVENTION

The invention generally relates to analyzing consumer behavior and content on a network, and more particularly, to systems and methods for curating content.

BACKGROUND OF THE INVENTION

The Internet continues to provide access to a nearly endless supply of new content and websites, which will continue to grow exponentially for the foreseeable future. This content growth is problematic for destination sites, content owners, and consumers.

For destination sites, there is increased competition for acquiring and retaining consumers. Many consumers rely on several favorite destination sites and/or frequent use of one or more search engines to discover desired content. Thus, destination sites must continually produce and/or acquire relevant content and convincingly present such content to their consumers. Search engines can be effective and are popular among consumers, however, such search engines are an intermediate step between the consumer and their desired content.

For content owners, there is difficulty in distributing and monetizing their content to increasing numbers of sites and audiences. To maximize potential revenue and profit, content owners must reach as large of an online audience as possible. In some instances, content owners must establish direct relationships with other destination sites or use conventional media or content distributors. Establishing and maintaining such relationships can be time consuming and expensive, and not every possible audience segment may be reached at any given time.

For consumers, it is increasingly difficult to discover all content the consumer really wants. Typically, consumers must "bounce" or otherwise surf between known destination sites, search results pages, or engage in numerous searches to find content they want. For many consumers, finding relevant content can be time consuming.

Conventional systems and methods for providing content to website consumers have relied on a variety of technologies and approaches, which in many instances, have yielded less than successful and often times inconsistent results. Since certain Internet advertising companies pioneered particular areas of contextual and behavioral targeting of advertising, the Internet industry has continually debated which targeting approach is more valid as particular companies begin to leverage these techniques to better target and recommend website content to site visitors. The reality is one or multiple models may be appropriate depending on the industry or content being consumed, versus relying on one particular approach. Various websites continue to implement technologies that give consumers more choices on what items they should click on next. Example links from section labels such as "Most Popular Stories", "People Who Read This Also Read This", "Related Content", or "Most Commented" are often used as a next step. One goal of targeting content is to better predict consumer preference and demand for content, and then provide consumers with content they will find more interesting. Conventional systems and methods described above have several drawbacks and limitations.

Conventional contextual targeting utilizes keyword frequency to find additional content that includes mentions of primary subjects in an article. If an article is written about "Bernie Madoff", contextual targeting will locate more content on "Bernie Madoff" based on the number of times "Bernie Madoff" is mentioned in additional articles, and then recommend content containing his name. The more times "Bernie Madoff" is mentioned, the higher the relevancy score for the article. A typical news site may have, for instance, 20 to 30 prior articles about "Bernie Madoff", so a conventional system may select certain articles based on relevancy and publish date (newer articles versus older). Direct measurement of prior time spent with "Bernie Madoff"-related content is not used in this approach to identify content that performs well within the news industry because direct measurement of all "Bernie Madoff"-related content articles may be needed, for example in a particular sample, identifying which of the 30 articles written about "Bernie Madoff", performed in the top 25% for consumer time spent with this content.

Conventional behavioral targeting of content utilizes selected additional content that other users have read based on commonalities in a navigational path. One conventional system utilizes collaborative-type filtering to accomplish this with its product recommendations. For example, if 20 users navigate from webpage A to webpage B, webpage B will be recommended on webpage A more frequently because it is navigated to more frequently. While this works well for certain websites with a particular scale and catalog depth, one problem with this approach as it relates to news and article related content is that whatever content is posted on a home page or is marketed as "popular" may tend to get recommended by users more because most consumers or users may only click on links from the home page. Thus recommending what may be popular on a particular day may inhibit or otherwise prevent keeping consumers or users engaged with a broader set of article content.

Conventional web analytics provided by particular companies can utilize certain data collected from a single web site to determine which aspects of the website work towards their business objectives. For example, some entities measure which content categories receive the most clicks by consumers or users. In turn, website owners using a content management system can use this data or clickstream to manually identify, tag, and deliver content they think consumers or users want. However, tagging content is often a manual process and fraught with user error, and in some instances content can be mis-categorized. Certain types of conventional analytics and automated tagging technologies may analyze a website's content at the subject level, and provide those websites with new views of how their content performs in comparison with their industry to identify new content needs. While several entities focus on web measurement at the industry level, in most instances, these entities fail to provide industry data about the content within and across those websites.

Thus, conventional systems and methods focus either on website traffic statistics (at the site level), such as site rankings, the growth rate and consumer sentiment around specific keywords, which in some instances may not be useful or particularly relevant measures of consumer interest in or demand for specific content, or utilize a purely contextual or behavioral approach to target content to consumers. Therefore, a need exists for systems and methods for providing targeted content to a network user.

Furthermore, conventional processes for distributing content to consumers via a network can be time consuming and expensive since the content must be frequently accessed at a content provider's server or otherwise made available via webpages and websites that often times must be consistently maintained. In many instances, an editor or publisher must manually review content before it is distributed to consumers, which increases the cost and time to distribute the content. Occasionally, certain content may not be suitable for certain audiences, and the editor or publisher may impose his or her own judgment to determine the suitability of such content for the intended audience. Therefore, a need exists for systems and methods for curating content to provide to a network user.

SUMMARY OF THE INVENTION

Embodiments of the invention can provide some or all of the above needs. Certain embodiments of the invention can provide systems and methods for curating content.

In one embodiment, a method for curating content from a set of third party webpages can be provided. The method can include aggregating content from the third party webpages, receiving an indication that content from one or more of the third party webpages has been selected, receiving an indication of a selected interface position for at least a portion of the selected content, and outputting an interface with the portion of selected content in the selected interface position.

In one aspect of an embodiment, aggregating content from the third party webpages can include at least one of: storing content from the third party webpages in at least one data storage device, storing links to the third party webpages in at least one data storage device, or facilitating access to content from the third party webpages via at least one proxy tool.

In one aspect of an embodiment, aggregating content from the third party webpages can further include permitting a user to browse the aggregated content.

In one aspect of an embodiment, the method can include providing a drag and drop tool for a user to select content from the third party webpages and to select a desired interface position for the selected content.

In one aspect of an embodiment, the method can include providing an access control tool for a user to select at least one of the following criteria associated with the selected content: exclusion of the selected content from a webpage or a website, exclusion duration for the selected content, publication time for the selected content, and number of webpages to populate with the selected content.

In one aspect of an embodiment, the method can include providing a content filter tool for a user to filter selected content based at least in part on keyword, consumer preferences, consumer maturity or appropriateness ratings, or consumer popularity.

In one aspect of an embodiment, receiving an indication that content from one or more of the third party webpages has been selected, and receiving an indication of a selected interface position for at least a portion of the selected content can be implemented by a drag and drop tool manipulated by a user.

In one aspect of an embodiment, the method can include facilitating publication of the portion of the selected content in the selected interface position to an online user.

In another embodiment, a system for selecting and curating content from third party webpages can be provided. The system can include at least one data storage device operable to store computer-readable instructions; at least one computer processor operable to execute the computer-readable instructions; and a set of computer-readable instructions. The computer-readable instructions can be operable to aggregate content from the third party webpages; receive an indication that content from one or more of the third party webpages has been selected; receive an indication of a selected interface position for at least a portion of the selected content; and output an interface with the portion of selected content in the selected interface position.

In one aspect of an embodiment, the computer-readable instructions operable to aggregate content from the third party webpages can further include computer-readable instructions operable to perform at least one of: storing content from the third party webpages in at least one data storage device, storing links to the third party webpages in at least one data storage device, or facilitating access to content from the third party webpages via at least one proxy tool.

In one aspect of an embodiment, the computer-readable instructions operable to aggregate content from the third party webpages can further include computer-readable instructions operable to permit a user to browse the aggregated content.

In one aspect of an embodiment, the computer-readable instructions are further operable to provide a drag and drop tool for a user to select content from the third party webpages and to select a desired interface position for the selected content.

In one aspect of an embodiment, the computer-readable instructions are further operable to provide an access control tool for a user to select at least one of the following criteria associated with the selected content: exclusion of the selected content from a webpage or a website, exclusion duration for the selected content, publication time for the selected content, and number of webpages to populate with the selected content.

In one aspect of an embodiment, the computer-readable instructions are further operable to provide a content filter tool for a user to filter selected content based at least in part on keyword, consumer preferences, consumer maturity ratings, or consumer popularity.

In one aspect of an embodiment, the computer-readable instructions operable to receive an indication that content from one or more of the third party webpages has been selected, and to receive an indication of a selected interface position for at least a portion of the selected content can be implemented by a drag and drop tool manipulated by a user.

In one aspect of an embodiment, the computer-readable instructions are further operable to facilitate publication of the interface to an online user via at least one network.

Other systems and processes according to various embodiments of the invention will become apparent with respect to the remainder of this document.

BRIEF DESCRIPTION OF THE DRAWINGS

Reference will now be made to the accompanying drawings and exhibits, which may not necessarily be drawn to scale, and wherein:

FIGS. 2-23 illustrate example screenshots illustrating example methods in accordance with embodiments of the invention.

DETAILED DESCRIPTION OF EMBODIMENTS

Figure 1:
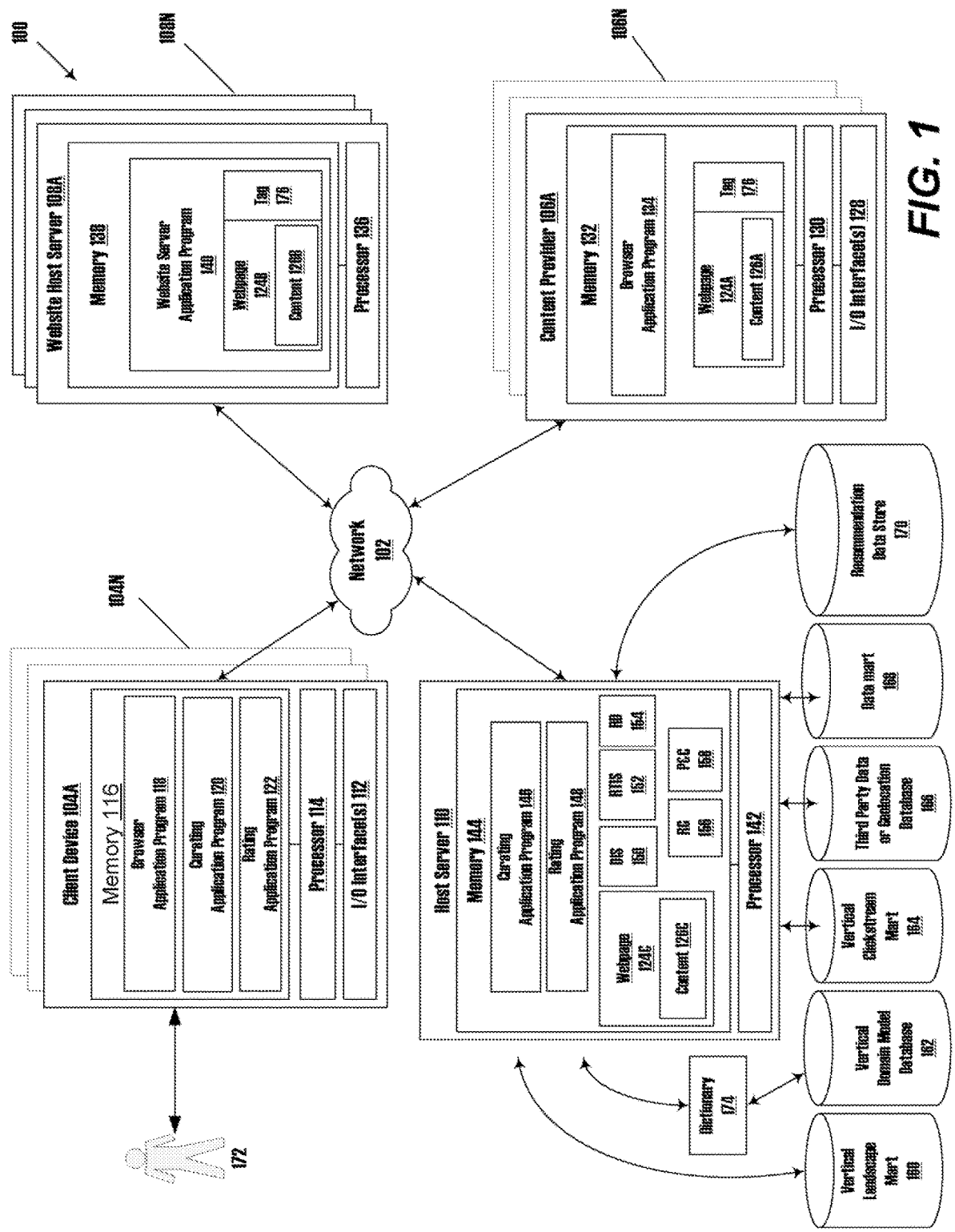
FIG. 1 illustrates an example system in accordance with an embodiment of the invention.

The invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will convey the scope of the invention. Like numbers refer to like elements throughout.

As used herein, the term "content" should be construed to describe any form of data or information presented by, posted on, or otherwise accessible from a webpage, video player, audio player, or website. Examples of content can include, but are not limited to, articles, webpages, websites, documents, blogs, blog posts, messages, tweets, emails, videos, files, graphics, images, and other electronic data. Content can include third party content, which can be content from a webpage or website provided by a content provider or from a website or destination host server, and previously stored content, which can be content collected or aggregated from one or more content providers and/or destination host servers and stored in a data storage device, such as a memory or database.

The terms "user," "consumer," "visitor," "editor," "webpage designer," and "publisher," and their pluralized forms should be construed to cover any entity or person accessing or otherwise requesting content from a webpage or a website.

The term "content provider" and its pluralized form should be construed to cover any entity or person generating, creating, collecting, or otherwise facilitating content for distribution to consumers via a webpage or website.

The terms "site," "destination site," "website," "destination website," and their pluralized forms should be construed to cover any webpage or website which a consumer or visitor visits or accesses via a network either by computer, mobile device, or other device connected to the network, such as the Internet.

The term "computer-readable medium" describes any form of memory or a propagated signal transmission medium. Propagated signals representing data and computer-executable instructions can be transferred between network devices and systems.

Embodiments of the invention can include systems and methods for curating content from a set of third party webpages. In one example embodiment, a method can include aggregating content from the third party webpages, receiving an indication that content from one or more of the third party webpages has been selected, receiving an indication of a selected interface position for at least a portion of the selected content, and outputting an interface with the portion of selected content in the selected interface position. In this manner, a content curating system can be provided wherein a user, such as an editor, webpage designer, or publisher, can construct, edit, modify, or otherwise generate webpages and/or websites using selected content from multiple sources.

Example System Architecture

FIG. 1 illustrates an example environment and system in accordance with an embodiment of the invention. In this example, the environment can be a client-server configuration, and the system can be a content curating system, a content presenting system, and/or a content rating system. In either instance, the system 100 is shown with at least one client device 104A in communication with at least one content provider 106A via a communications network 102. Any number of other client devices 104N and content providers 106N can also be in communication with the network 102. The network 102 is also shown in communication with at least one website host server 108A or destination site. Any number of other website host servers 108N or destination sites can also be in communication with the network 102. In addition, the network 102 is also shown in communication with at least one host server 110. Any number of other host servers can also be in communication with the network 102.

The communications network 102 shown in FIG. 1 can be, for example, the Internet. In another embodiment, the network 102 can be a wireless communications network capable of transmitting both voice and data signals, including image data signals or multimedia signals. Other types of communications networks, including local area networks (LAN), wide area networks (WAN), a public switched telephone network, or combinations thereof can be used in accordance with various embodiments of the invention.

Each of the client devices 104A-104N is typically associated with an entity or person accessing or otherwise requesting content from a webpage or a website. Each client device 104A-104N can be a computer or processor-based device capable of communicating with the communications network 102 via a signal, such as a wireless frequency signal or a direct wired communication signal. A respective communication or input/output interface 112 associated with each client device 104A-104N can facilitate communications between the client device 104A-104N and the network 102 or Internet. Each client device, such as 104A, can include a processor 114 and a computer-readable medium, such as a random access memory (RAM) 116, coupled to the processor 114. The processor 114 can execute computer-executable program instructions stored in memory 116. Computer executable program instructions stored in memory 116 can include a browser application program, such as 118, a curating application program, such as 120, and a rating application program, such as 122.

A browser application program, such as 118, can be adapted to access and/or receive one or more webpages 124A-124C and associated content 126A-126C from at least one content provider, such as 106A; at least one remotely located website host server, such as 108A; at least one host server, such as 110; and/or a data storage device such as a database.

A curating application program, such as 120, can be adapted to provide automated curation functionality to identify and highlight certain third party content based on other users' viewing and selection of relatively popular or frequently viewed content. The curating application program 120 can utilize any number of machine learning algorithms or other algorithms to identify relatively popular or frequently selected or viewed content by similar users including, but not limited to, supervised, unsupervised, or reinforced learning algorithms that can analyze any number of attributes of content in conjunction with a user or editor's prior content selections or selections of like-minded editors.

Furthermore, a curating application program, such as 120, can be adapted to store or otherwise aggregate content from a third party, such as a content provider 106A-106N or a website host server 108A-108N. Original third party content, such as 126A-126B, stored on a third party website or webpage, such as 124A-124B, can be crawled or otherwise accessed by the curating application program 120, and normalized and cleansed, for instance, before the aggregated content is stored by the program 120 in a data storage device, such as a memory 144 or database 160-170 associated with a host server, such as 110. Thus, in certain instances, the third party content 126A-126B may not be stored by the curating application program 120 in its native or original form, but instead, the third party content can be normalized and cleansed, or otherwise transformed by the curating application program 120 prior to storing the content in a data storage device, such as 144 or 160-170, for subsequent access. For example, a third party webpage or third party content can be normalized using one or more techniques and/or routines to standardize text, formatting, graphics, video, and/or associated code or programming controls associated with the third party webpage or third party content. By way of further example, a third party webpage or third party content can be cleansed using one or more techniques and/or routines to delete or otherwise modify text, formatting, graphics, video, and/or associated code or programming controls associated with the third party webpage or third party content. In other instances, the third party content 126A-126B may be stored by the curating application program 120 in its native or original form without normalizing and/or cleansing, or other transformation by the curating application program 120 prior to storing the content in a data storage device, such as 144 or 160-170, for subsequent access.

Moreover, a curating application program, such as 120, can also be adapted to provide editing functionality to construct or otherwise modify webpages using previously stored or aggregated content, such as content 126C, which can be derived from third party content, such as 126A-126B, from a content provider, such as 106A; at least one remotely located website host server, such as 108A; and stored in at least one host server, such as 110, and/or a data storage device such as a memory 144 or database 160-170. Editing functionality can include, but is not limited to, browsing functionality, proxy functionality, drag and drop functionality, cut and paste functionality, access functionality, filtering functionality, publishing functionality, and any other function or command to select certain content for transfer from one webpage and/or website to another webpage and/or website. In one example, browsing functionality can include a browsing tool to permit a user to browse previously stored or aggregated content, such as 126C, in a host server, such as 110, and/or in a data storage device, such as a memory 144 or database 160-170. In another example, proxy functionality can include a proxy or browsing tool that permits a user to browse original third party content, such as content 126A-126B, which is stored by a content provider, such as 106A-106N; at least one remotely located website host server, such as 108A-108N, or an associated data storage device, such as a third party server or database. In another example, editing functionality can include a drag and drop tool to select content from a third party webpage and to select a desired interface position for the selected content. In yet another example, access functionality can include an access control tool for a user to select at least one of the following criteria associated with selected content: publication time for the selected content, and number of webpages and/or websites to populate with the selected content. In yet a further example, filtering functionality can include a content filter tool for a user to filter selected content based at least in part on keyword, consumer preferences, consumer maturity or appropriateness ratings, or consumer popularity. In another example, publishing functionality can include facilitating publication of the portion of selected content in a selected interface position to an online user.

A rating application program, such as 122, can be adapted to permit content, such as 126, associated webpages, such as 124, and/or associated websites to be rated for audience appropriateness. For example, a rating application program such as 122 can include functionality to provide a set of rating indicators for a user to rate content for audience appropriateness. A set of rating indicators can include, but is not limited to, G, PG, PG-13, R, NC-17, all ages, parental guidance may be needed, not recommended for a younger audience, restricted to an older audience, adults only, E, EC, E10+, T, M, AO, RP, any motion picture rating certification, any entertainment software rating board certification, or any other media rating. When one or more indicators are selected and submitted to the rating application program, such as 122, the program 122 can store the indicators in a data storage device, such as a memory 144 or database 160-170, for subsequent retrieval and/or processing. In another example, a rating application program such as 122 can include functionality to determine an aggregated rating for particular content.

Each of the content providers 106A-106N is typically associated with a third party entity or person that generates, collects, or otherwise facilitates distribution of content to consumers via a webpage or website. Each content provider 106A-106N can be associated with a computer or processor-based device capable of communicating with the communications network 102 via a signal, such as a wireless frequency signal or a direct wired communication signal. A respective communication or input/output interface 128 associated with each content provider 106A-106N can facilitate communications between the content provider 106A-106N and the network 102 or Internet. Each content provider, such as 106A, can include a processor 130 and a computer-readable medium, such as a random access memory (RAM) 132, coupled to the processor 130. The processor 130 can execute computer-executable program instructions stored in memory 132. Computer executable program instructions stored in memory 132 can include a browser application program, such as 134, which, in one embodiment, can be similar to 118. In another embodiment, the browser application program 134 can be adapted to transmit one or more third party webpages, such as 124A, and associated third party content, such as 126A, residing at the one or more content providers 106A-106N as well as access one or more third party webpages 124B and any associated third party content 126B residing at the one or more destination sites or website host servers 108A-108N.

Each destination site or website host server 108A-108N is typically associated with a third party entity or person, who may be or may not be associated with a content provider 106A-106N. In some instances, a destination site or website host server 108A-108N could be associated with a news media outlet. In other instances, a destination site or website host server 108A-108N could be associated with an independent blog. Other association examples for a destination site or website host server 108A-108N can include, but are not limited to, a publisher, or an author. In any instance, each destination site or website host server 108A-108N can be a computer or processor-based device capable of communicating with the communications network 102 via a signal, such as a wireless frequency signal or a direct wired communication signal. Each destination site or website host server, such as 108A, can include a processor 136 and a computer-readable medium, such as a random access memory (RAM) 138, coupled to the processor 136. The processor 136 can execute computer-executable program instructions stored in memory 138. Computer executable program instructions stored in memory 138 can include a website server application program, such as 140. The website server application program 140 can be adapted to receive one or more third party webpages 124A and any associated third party content 126A from the one or more content providers 106A-106N as well as serve or otherwise facilitate access to one or more third party webpages 124B and any associated third party content 126B residing on the website host server 108A-108N to the one or more client devices 104A-104N, content providers 106A-106N, and/or host server 110.

The host server 110 can be a computer or processor-based device capable of communicating with the communications network 102 via a signal, such as a wireless frequency signal or a direct wired communication signal. The host server 110 can include a processor 142 and a computer-readable medium, such as a random access memory (RAM) 144, coupled to the processor 142. The processor 142 can execute computer-executable program instructions stored in memory 144. Computer executable program instructions stored in memory 144 can include a curating application program, such as 146, and a rating application program, such as 148. The curating application program 146 can be similar to 120 described above, and the rating application program 148 can be similar to 122 described above. Other computer-executable instructions stored in memory can include a data integration services (DIS) module or engine, such as 150; a promotion delivery/targeting or real time syndication (RTIS) module or engine, such as 152; a recommendation delivery (RD) module or application, such as 154; a recommendation generation (RG) service module or application, such as 156; and a parsing and cleaning (P&C) module or application, such as 158. In any instance, the associated computer executable program instructions including the data integration services (DIS) module or engine 150 can be adapted to receive and/or collect various data from any number of client devices 104A-104N, content providers 106A-106N, destination sites or website host servers 108A-108N, and databases or data storage devices, such as 160, 162, 164, 166, 168, and 170. The associated computer executable program instructions including the data integration services (DIS) module or engine 150 can be further adapted to transform, aggregate, or otherwise normalize some or all of the received and/or collected data according to any number of predefined algorithms or routines.

Generally, each of the memories 116, 132, 138, 144, and data storage devices 160, 162, 164, 166, 168, and 170 can store data and information, such as webpages 124A-124C and content 126A-126C, for subsequent retrieval. In this manner, the system 100 can store various received or collected information, such as webpages 124A-124C and content 126A-126C, in memory associated with a client device, such as 104A, a content provider, such as 106A, a destination site or website host server, such as 108A, a host server 110, or a database, such as 160, 162, 164, 166, 168, and 170. The memories 116, 132, 138, 144, and databases 160, 162, 164, 166, 168, and 170 can be in communication with other databases, such as a centralized database, or other types of data storage devices. When needed, data or information stored in a memory or database may be transmitted to a centralized database capable of receiving data, information, or data records from more than one database or other data storage devices. The databases 160, 162, 164, 166, 168, and 170 shown in FIG. 1 include, but are not limited to, a vertical landscape mart 160, a vertical domain model database 162, a vertical clickstream mart 164, a third party data or geo-location database 166, a data mart 168, and a recommendation data store 170. In other embodiments, some or all of the databases can be integrated or distributed into any number of databases or data storage devices.

Suitable processors for a client device 104A-104N, a content provider 106A-106N, a destination site or website host server 108A-108N, and a host server 110 may comprise a microprocessor, an ASIC, and state machines. Example processors can be those provided by Intel Corporation and Motorola Corporation. Such processors comprise, or may be in communication with media, for example computer-readable media, which stores instructions that, when executed by the processor, cause the processor to perform the elements described herein. Embodiments of computer-readable media include, but are not limited to, an electronic, optical, magnetic, or other storage or transmission device capable of providing a processor, such as the processor 114, 130, 136, or 142, with computer-readable instructions. Other examples of suitable media include, but are not limited to, a floppy disk, CD-ROM, DVD, magnetic disk, memory chip, ROM, RAM, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C #, Visual Basic, Java, Python, Perl, and JavaScript.

Client devices 104A-104N may also comprise a number of other external or internal devices such as a mouse, a CD-ROM, DVD, a keyboard, a display, or other input or output devices. As shown in FIG. 1, a client device such as 104A can be in communication with an output device via a communication or input/output interface, such as 112. Examples of client devices 104A-104N are personal computers, mobile computers, handheld portable computers, digital assistants, personal digital assistants, cellular phones, mobile phones, smart phones, pagers, digital tablets, desktop computers, laptop computers, Internet appliances, and other processor-based devices. In general, a client device, such as 104A, may be any type of processor-based platform that is connected to a network, such as 102, and that interacts with one or more application programs. Client devices 104A-104N may operate on any operating system capable of supporting a browser or browser-enabled application including, but not limited to, Microsoft Windows®, Apple OSX™, and Linux. The client devices 104A-104N shown include, for example, personal computers executing a browser application program 118, such as Google Opera™, Google Chrome™, Microsoft Corporation's Internet Explorer™, Netscape Communication Corporation's Netscape Navigator™, Apple's Safari™, Mozilla Firefox™, and RockMelt Inc.'s RockMelt™.

In one embodiment, suitable client devices can be standard desktop personal computers with Intel x86 processor architecture, operating a Microsoft® Windows® operating system, and programmed using a Java language.

Examples of content providers 106A-106N are servers, personal computers, mobile computers, handheld portable computers, digital assistants, personal digital assistants, cellular phones, mobile phones, smart phones, pagers, digital tablets, desktop computers, laptop computers, Internet appliances, and other processor-based devices. In general, a content provider, such as 106A-106N, may be any type of processor-based platform that is connected to a network, such as 102, and that interacts with one or more application programs.

Servers 108A-108N and 110, each depicted as a single computer system, may be implemented as a network of computer processors. Examples of suitable servers are server devices, mainframe computers, networked computers, a processor-based device, and similar types of systems and devices.

Aggregating and Syndicating Content

The example system 100 shown in FIG. 1 can aggregate content for subsequent storage, retrieval, and syndication. As described in co-pending U.S. application Ser. No. 12/647,304, filed on Dec. 24, 2009, entitled "Systems and Methods for Providing Targeted Content to a Network User," and in U.S. application Ser. No. 12/367,968, entitled "Systems and Methods for Identifying and Measuring Trends in Consumer Content Demand Within Vertically Associated Websites and Related Content," filed Feb. 9, 2009, both of which are hereby incorporated by reference, instructions stored in either the host server processor 142 or the memory 144, or both, such as the data integration service module or engine 150, can initiate and aggregate some or all of the data streams from databases 160, 162, 164, 166, 168, and 170 or other data sources. Based at least in part on some or all of the data, certain content can be retrieved and syndicated to one or more webpages and/or websites.

For example, in one embodiment, the processor 142 can implement a crawl or search of one or more webpages 124A, 124B and associated content 126A, 126B stored on any number of content providers 106A-106N and website host servers 108A-108N. Job crawl data received by or otherwise collected by way of the crawl can be stored in a data storage device such as the vertical landscape mart 160 or similar database. By way of another example in one embodiment, the processor 142 can implement loading of one or more dictionaries 174 in a data storage device such as the vertical domain model database 162. In yet another example in one embodiment, the processor 142 can implement receiving click session data from one or more V-tags or tags 176 associated with any number of webpages 124A, 124B stored on at least one content provider, such as 106A, and/or website host server, such as 108A, and being accessed or otherwise visited by at least one consumer, such as 172. The processor 142 can store the click session data in a data storage device such as the vertical clickstream mart 164 or similar database.

In the example embodiment shown, the host server processor 142 and/or data integration service module or engine 150 can be adapted to combine consumer session data with crawl job data, and store some or all of the data in a data storage device such as the data mart 168 or database. The processor 142 and/data integration service module or engine 150 can be adapted to normalize some or all of the received and/or collected data using any number of algorithms or routines. The data integration or vertical transformation process can also be adapted to perform contextual analysis of certain keywords to track consumer content consumption at the keyword level using vertical or industry-specific dictionaries of keywords.

In the example embodiment shown, a processor 142 or data integration service module or engine 150 can utilize a third party data or geolocation database, such as 166, to determine third party data or location information associated with one or more URLs associated with a respective website, website host server address, network address, IP address, or client device IP address. The third party data or location information can also be utilized by the processor 142 or data integration service module or engine 150 to analyze, process, and filter some or all of the previously collected consumer session data with crawl job data.

In the example embodiment shown, a processor 142 and/or the data integration service module or engine 150 can aggregate data from one or more of the following: crawled webpage data, vertical clickstream data, and previously stored webpage visitation data. Based at least in part on some of the aggregated data, one or more trends associated with an industry vertical can be determined. Based at least in part on one or more trends associated with an industry vertical, at least one content recommendation for the consumer can be determined. Furthermore, the at least one content recommendation can be output to the consumer via the webpage. In this manner, certain content can be syndicated to any number of webpages and/or websites.

In any instance, certain combinations of consumer session data, crawl job data and/or third party data can be transformed by a processor 142 and/or a data integration service module or engine, such as 150, to representative data for providing targeted content for a network user.

In the example embodiment shown, the processor 142 and/or the real time syndication module or engine 152 can receive at least one provider metric and/or statistic from a content provider. Based at least in part on the at least one provider metric and/or statistic, associated content, such as webpage 124C and content 126C, to transmit to at least one destination site can be determined. Furthermore, the associated content, such as webpage 124C and content 126C, can be transmitted to the at least one destination site for viewing by at least one consumer or user, such as 172.

In the example embodiment shown, the processor 142 and/or the real time syndication module or engine 152 can automatically negotiate and determine content to transmit to at least one destination site, such as a webpage 124C and content 126C hosted by a website host server 108A. Based on one or more provider metrics and/or statistics from a content provider such as 106A, and one or more consumer metrics and/or statistics from a webpage, such as hosted by a destination or website host server 108A, a determination of suitable content to transmit to the destination site, such as webpage 124C, can be made. In this manner, certain content can also be syndicated to any number of webpages and/or websites. One technical effect of syndicating content to webpages and/or websites is the ability to optimize the webpage and/or website for viewer interest. In certain instances, the "lift" or the time consumers or visitors spend on each optimized webpage or website can be increased.

In the example embodiment shown, the processor 142 and/or the real time syndication module or engine 152 can determine an alternative provider metric and/or statistic based at least in part on consumer demand for the associated content, and can communicate the alternative provider metric and/or statistic to the content provider such as 106A. In certain instances, based at least in part on consumer demand for the associated content, a new provider metric and/or statistic can be automatically negotiated by the processor 142 and/or the real time syndication module or engine 152. Based at least in part on the new provider metric and/or statistic, selected associated content can be determined to transmit to the at least one destination site, such as a webpage 124B and content 126B hosted by a destination or website host server 108A, for viewing by at least one consumer or user, such as 172, via a client device, such as 104A.

The example system 100 shown in FIG. 1 can output or otherwise display one or more reports for a user, such as 172, via an output device, such as a display device or printer, associated with a client device 104A-104N or host server 110. In one embodiment, consumer behavior with respect to a predefined keyword can be printed on an output device, such as a printer (not shown), associated with a client device, such as 104A, for a user's benefit or consumption. In another embodiment, consumer behavior with respect to a predefined keyword can be displayed on an output device, such as a display device (not shown), associated with a client device, such as 104A, for a user. In other embodiments, various consumer responses and demands with respect to certain metrics can be displayed on an output device, such as a display (not shown), associated with a content provider, such as 106A, or a client device, such as 104A, for a user. Suitable types of output devices for users can include, but are not limited to, printers, printing devices, output displays, and display screens. Thus, both content providers and destination sites can receive and analyze reports based on any number of provider metrics and/or consumer metrics, and consumer demand for associated content and/or selected associated content provided to destination sites.

After the system 100 aggregates content from any number of content providers 106A-106N, such as webpages 124A-124B and associated content 126A-126B including, but not limited to, original or third party owned images, pictures, documents, objects, sounds, files, and other electronic data, the system 100 can store and/or otherwise access via the network 102 any number of corresponding webpages 124C and associated content 126C. The system 100 can store any number of corresponding webpages 124C and associated content 126C as well as links or locations to any number of original third party webpages 124A-124B and associated content 126A-126B in memory 144 at the host server 110, or in a data storage device such as a database, for example, 160-170. In certain instances, the original third party webpages 124A-B and associated content 126A-126B can be normalized and cleansed, or otherwise transformed, prior to storing one or more corresponding webpages 124C and associated content 126C. Other embodiments of the invention can use other components and/or processes to aggregate, store, target, syndicate, and transmit third party content or previously stored or aggregated content to certain webpages and/or websites.

Providing and Presenting Content

In certain instances, particular users, such as editors, webpage designers, or publishers, may desire to browse third party content for use in a webpage, website, email, or other electronic format or message. For example, third party content on a webpage or website, such as content 126A, 126B on webpage 126A, 124B at a content provider 106A and/or website host server 108A, can be browsed by a user, such as 172, via a browser application program, such as 118, for use as content on another webpage or website. The system 100 by way of the curating application program, such as 120, operating in conjunction with the browser application program 118, can permit a user, such as 172, to browse third party content, such as content 126A, 126B on webpage 124A, 124B at a content provider 106A and/or website host server 108A. When the user 172 indicates a selection of certain third party content, for instance, indicating by way of a client device, such as 104A, via any number of input and output devices (not shown) such as a keyboard, touch screen, a touchpad, and/or a mouse, the system 100 provides the user 172 with access to a previously stored portion of content corresponding to the selected third party content. For example, the curating application program 120 can generate a template, such as a webpage, for the user 172 to view the selected content, and output the stored portion of content in the template or webpage, wherein the user can view the stored portion of content corresponding to the selected third party content. In this manner, the system 100 can control user access to third party content and facilitate user access to certain selected content, while maintaining an audit trail for users' selection of third party content via the users' access to the corresponding stored content. One technical effect of controlling user access to third party content is the ability to audit any number of users' access to such content and provide an additional measure of security for content owners against unauthorized copying or use of their content.

Manually Curating Content

When particular users, such as editors, webpage designers, or publishers, select certain third party content for use in a webpage, website, email, or other electronic format or message, for example, using selected third party content as one or more recommended articles positioned adjacent to a primary article on a webpage or website, a user, such as 172, can interact with the system 100 by way of a client device, such as 104A. Using any number of input and output devices (not shown) such as a keyboard, touch screen, a touchpad, and/or a mouse, the user can interact with a curating application program, such as 120, which in certain instances, can operate in conjunction with a browser application program, such as 118, to provide access for the user 172 to corresponding previously stored content located in memory 144 at the host server 110; and/or in a data storage device such as a database, for example, 160-170. Thus, the system 100 permits selection of certain third party content from an original webpage or website, and then facilitates the transfer or transmission of corresponding previously stored content to a desired location, such as a webpage or website of the user's choice. For example, the curating application program 120 can provide one or more tools, such as a drag and drop tool, for the user 172 to select content 126A, 126B from one or more webpages 124A, 124B as viewed on a third party webpage or website, such as hosted by a content provider such as 106A or destination host server such as 108A. The user 172 can manipulate an indicator or otherwise touch an interface to select the desired content 126A, 126B. After the desired content 126A, 126B is selected, the user 172 can further select a desired position in a new or another webpage for the selected content 126A, 126B. For instance, the user 172 can drag the desired content 126A, 126B to a desired position in the new or other webpage and release or drop the desired content 126A, 126B in the desired position. The desired position may be adjacent to a primary article in the new or other webpage. As discussed above, the curating application program 120 can facilitate the user's view of the selected content, and output the stored portion of content in the template or webpage, wherein the user can view the stored portion of content.

In addition to selecting content 126A, 126B, a user, such as 172, can utilize an access control tool provided by the curating application program, such as 120, to select one or more of the following criteria associated with the selected content: exclusion of the selected content from a webpage or a website, exclusion duration for the selected content, publication time for the selected content, and number of webpages to populate with the selected content.

In this manner, a user can curate content for a webpage and/or website by selecting certain content. One technical effect of curating content for webpages and/or websites is the ability to optimize the webpage and/or website for viewer interest. In certain instances, the "lift" or the time consumers or visitors spend on each optimized webpage or website can be increased.

Automating the Curation of Content

In other instances, the system, such as 100, may identify certain content to recommend to particular users, such as editors, webpage designers, or publishers, who may desire to select certain aggregated or stored content for use in a webpage, website, email, or other electronic format or message. For example, certain content may be identified by the curating application program, such as 120, by way of any number of machine learning algorithms or other algorithms that identify relatively popular or frequently selected or viewed content by similar users. For example, content of interest may be identified based at least in part on users with similar characteristics viewing and/or selecting certain content. Characteristics can include, but may include, job title, publication or media genre, age, interest, geographic location, or other identifying characteristic.

In any instance, when such content is identified by the curating application program, such as 120, the curating application program, such as 120, can highlight such content for the user to consider as one or more recommended articles positioned adjacent to a primary article on a webpage or website.

In this manner, the system 100 can automatically curate content for use in a webpage and/or website by identifying certain content, which may be of relatively high interest to the user. One technical effect of automatically curating content for webpages and/or websites is the ability to optimize the webpage and/or website for viewer interest. In certain instances, the "lift" or the time consumers or visitors spend on each optimized webpage or website can be increased.

Rating Content

In other instances, particular users, such as consumers, may desire to rate certain content for audience appropriateness. A user, such as 172, can interact with the system 100 by way of a client device, such as 104A, via any number of input and output devices (not shown) such as an output display device, keyboard, touch screen, a touchpad, and/or a mouse. Using the client device 104A, the user can interact with a rating application program, such as 122, which in certain instances, can interact with a browser application program, such as 118, to provide access for the user 172 to one or more webpages 124 and/or content 126 located in memory 144 at the host server 110; in a data storage device such as a database, for example, 160, 162, 164, 166, 168, and 170; in a destination site or website server host, such as 108A; or in content provider, such as 106A. The rating application program 122 can provide one or more tools, such as a set of rating indicators, for the user 172 to rate at least a portion of the content 126A, 126B from one or more webpages 124A, 124B for audience appropriateness. For example, a user, such as 172, can select an indicator or otherwise touch an interface to select a desired rating indication for particular content, such as 126A. After the particular content 126A is rated by the user 172, the rating indication can be received by the rating application program 122 which aggregates rating indications from one or more users for the particular content 126A. Each rating indication and/or the aggregated rating indications can be stored by the rating application program 122 in a data storage device, such as memory 144 and/or a database 160-170 for subsequent retrieval and/or processing. Based on the aggregated rating indications, the rating application program 122 can determine an aggregated or single rating for the particular content 126A. For example, a user may select an indicator which includes at least one of the following: G, PG, PG-13, R, NC-17, all ages, parental guidance may be needed, not recommended for a younger audience, restricted to an older audience, adults only, E, EC, E10+, T, M, AO, RP, any motion picture rating certification, any entertainment software rating board certification, or any other media rating. By way of further example, multiple users may select varying indicators for particular content 126A and the rating application program 122 may determine an aggregated rating indication for the particular content 126A.

In this manner, a user can rate content from, for instance, a webpage and/or website, such that the aggregated ratings from one or more users can be used to rate the content for audience appropriateness. One technical effect of rating webpages and/or websites is that, in certain instances, the webpage and/or website can be optimized for viewer interest, and the "lift" or the time consumers or visitors spend on each optimized webpage or website can be increased.

One may recognize the applicability of embodiments of the invention to other environments, contexts, and applications. One will appreciate that components of the system 100 shown in and described with respect to FIG. 1 are provided by way of example only. Numerous other operating environments, system architectures, and device configurations with fewer or greater numbers of elements are possible. Accordingly, embodiments of the invention should not be construed as being limited to any particular operating environment, system architecture, or device configuration.

Example Processes for Curating, Presenting, and Rating Content

Example data flows, methods, and processes for curating and presenting content, which can be implemented with the example system 100, are described by reference to FIGS. 2-21, 24-25, and 29. Example data flows, methods, and processes for rating content, which can be implemented with the example system 100, are described by reference to FIGS. 22, 23 and 26-28.

Figure 2:
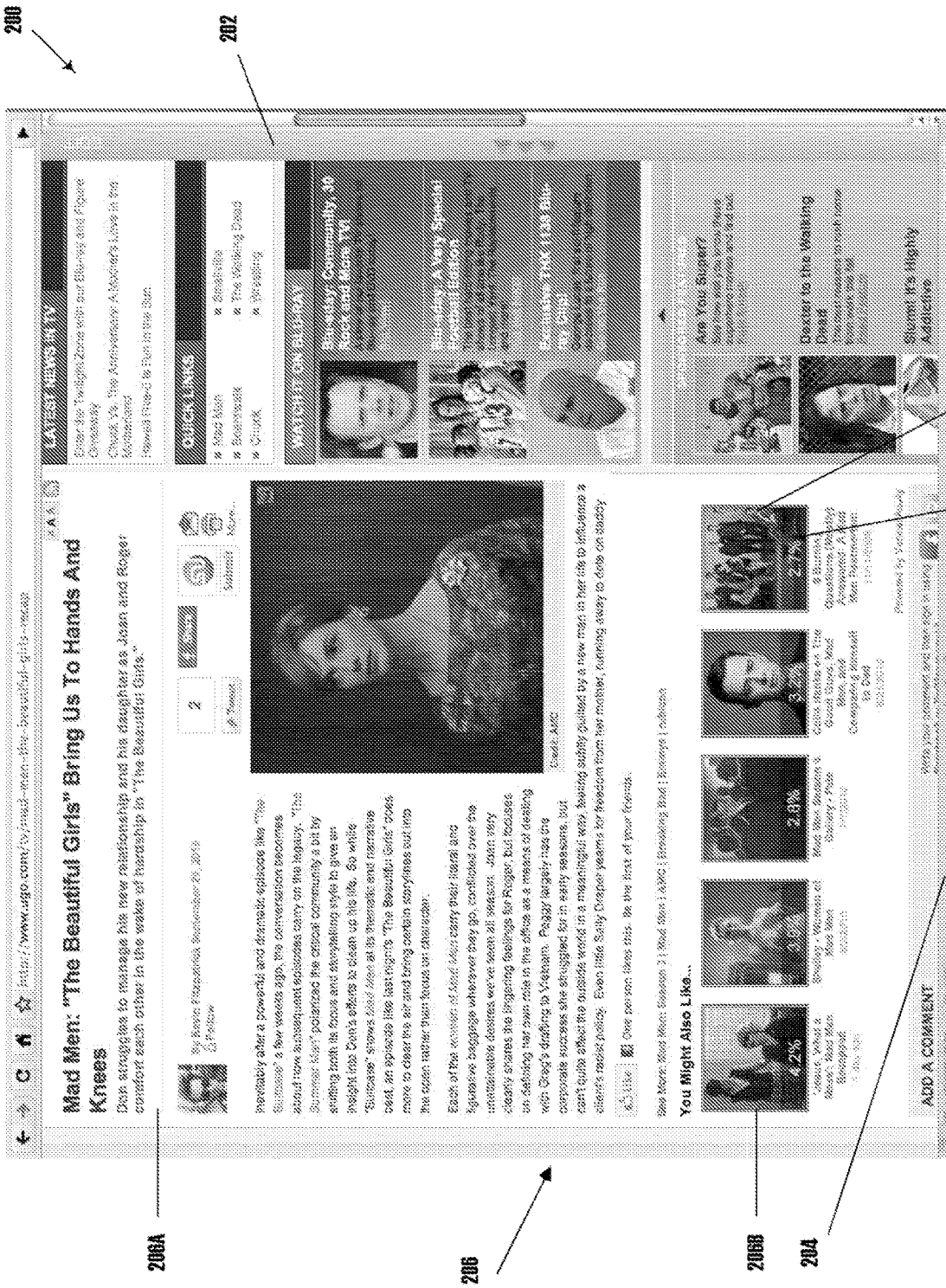

In FIG. 2, an example user interface 200 for curating and presenting content is shown generated by a browser application program, such as 118 in FIG. 1, operating in conjunction with a curating application program, such as 120. The user interface 200 can be used to select, edit, present, and curate content on one or more webpages or websites controlled by or otherwise managed by a user, such as 172 in FIG. 1. For example, the user interface 200 shown can be a full size screen window with an edit command bar 202 along one vertical side of the window and a discover command bar 204 along one horizontal side of the window. Other embodiments can provide different command options such as respective edit command and discover command buttons in which both command options can be simultaneously viewed by the user 172. Initially, the browser application program 118 can facilitate access for a user, such as 172, to edit content on a webpage or website of interest, which may be stored in memory, such as 116 or 144; on a client device, such as 104A; or on a host server, such as 110; or a data storage device, such as any of databases 160-170. The curating application program 120 can provide user editing and discover command features by way of the edit command bar 202 and discover command bar 204.

The content 206 shown on the example webpage in the user interface 200 of FIG. 2 can include a primary article 206A as well as one or more recommended content or articles, such as 206B-206N, that have been previously aggregated or otherwise stored by the system, such as 100 in FIG. 1. Recommended content can include, but is not limited to, articles, webpage, website, documents, blog, blog posts, messages, tweets, emails, videos, files, graphics, images, or other electronic data. In the example of FIG. 2, the content 206 shown is a primary article 206A in the upper portion of the webpage and a series of recommended articles 206B-206N represented as thumbnail images, each with an associated title and date or recency information, in a lower portion of the webpage following the heading "You Might Also Like . . . " A relevance ranking or other indicator, such as 208, provided by the curating application program 120 for each recommended article 206B-206N can be displayed adjacent to or overlaying a portion of the respective recommended article 206B-206N. For example, a percentage, such as 2.7%, of content readers that have clicked through to the particular recommended article, such as 206N, can be displayed by the curating application program 120. Systems and methods for collecting metrics and/or statistics for determining a percentage or other relevance ranking or indicator are described in co-pending U.S. application Ser. Nos. 12/367,968 and 12/647,304. In this manner, a user such as 172 can select one or more of the recommended articles 206B-206N for curation, optimization, or deletion depending on the relevance ranking or other indicator.

In FIG. 3, a user selects one or more recommended articles for curation, optimization, or deletion. Using an input device, such as a mouse or touch screen, the user 172 can select the entire series of recommended articles 206B-206N. When the entire series of articles 206B-206N is selected, the curating application program 120 can outline or otherwise highlight the series of recommended articles 206B-206N in a box 300 by a dashed line or other indicator surrounding the selected series of articles 206B-206N. The curating application program 120A can also provide a group exclusion tool 302 and a group configuration tool 304, which can be displayed as respective icons in the upper right corner of the box 300 for selection by the user 172. If desired, the user 172 can also select particular recommended articles 206B-206N for curation, optimization, or deletion. In addition, the user 172 can configure the locations or recommendation slots where the recommended articles 206B-206N are positioned. Again, using an input device, such as a mouse or touch screen, the user 172 can select a particular recommended article, such as 206C. When the particular recommended article, such as 206C, is selected, the curating application program 120 may outline or otherwise highlight the particular article 206B-206N. The curating application program 120A can also provide an individual exclusion tool 306, an individual configuration tool 308, and an individual information tool 310, which can be displayed as respective icons in the upper right corner of the particular recommended article, such as 206C, for selection by the user 172.

Figure 4:
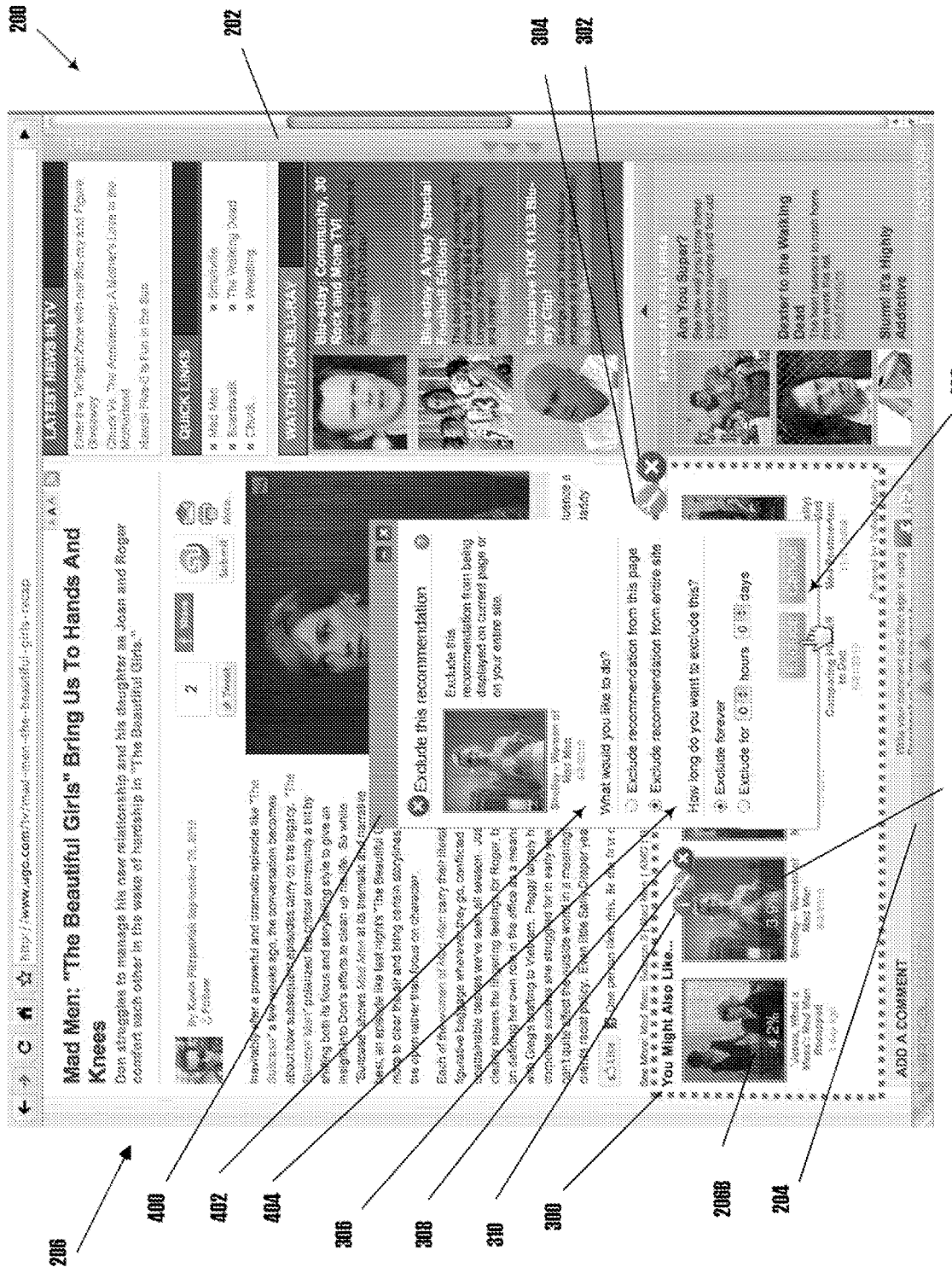

In FIG. 4, after a user, such as 172, selects the individual exclusion command tool 306 for a particular recommended article, such as 206C, a window 400 can pop-up to provide additional exclusion commands for the user 172. In this example, the additional exclusion commands can include options 402 to exclude the particular recommended article or content from being displayed or otherwise output on the webpage or on the entire website. Additional exclusion commands can include options 404 to exclude the article or content forever or for a particular duration measured in hours and/or days. Using the input device, such as a mouse or touch screen, the user 172 can select one or more options 402, 404 with exclusion commands for the particular recommended article 206C. Using a confirmation button 406 or cancel button, the user 172 can submit or cancel the option and command selections. When options 402, 404 with exclusion commands for the particular recommended article, such as 206C, are selected and confirmed by the user 172, the curating application program 120 can implement the desired exclusion commands with respect to the particular article 206C. For example, the curating application program 120 can generate or associate certain exclusion attributes and code corresponding with the selected exclusion commands for the particular recommended article 206C, and the attributes and code can be stored in a memory, such as 116, or another data storage device for subsequent retrieval or reference.

Figure 5:
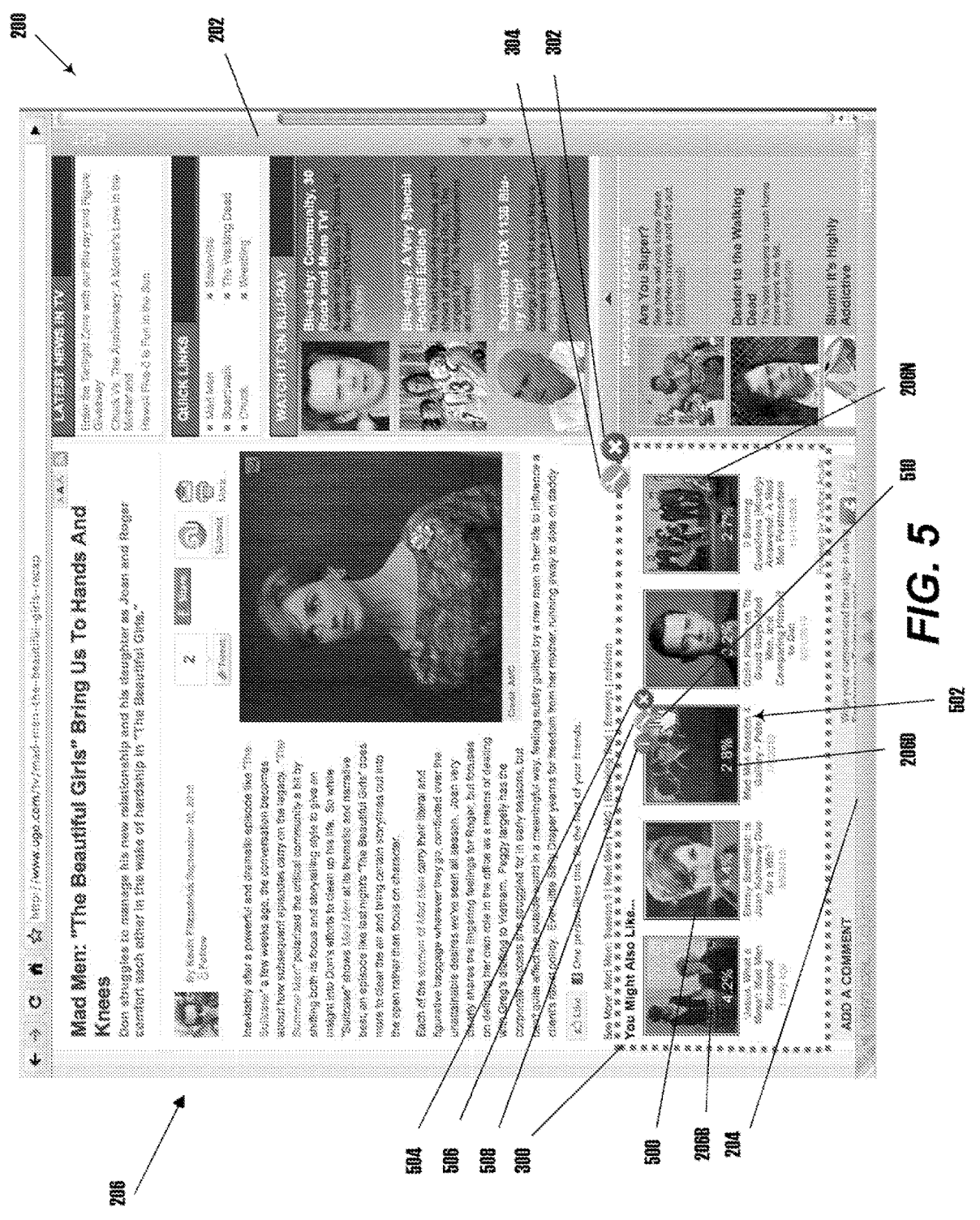

In FIG. 5, after the exclusion of a particular recommended article, such as 206C in FIG. 4, is confirmed by the user 172, the particular article 206C can be removed from the webpage and/or website by the curating application program 120, and a new thumbnail article 500 can automatically be populated by the curating application program 120 in the space where the previous particular article 206C was located on the webpage and/or website. Systems and methods for recommending, selecting, syndicating, and targeting content for a webpage and/or website are described in co-pending U.S. application Ser. Nos. 12/367,968 and 12/647,304. A user 172 may desire to configure a particular location or recommendation slot, such as 502, in which a recommended article, such as 206D, may already be positioned in, wherein the user 172 can select the particular location or recommendation slot 502 using an input device, such as a mouse or touch screen. Once selected, an individual exclusion tool 504, similar to 306; an individual configuration tool 506, similar to 308; and an individual information tool 508, similar to 310, can be displayed by the curating application program 120 as respective icons in the upper right corner of the particular thumbnail article 206D for selection by the user 172. In this example, the user 172 may select the individual configuration tool 506 using an input device or an indicator, such as 510, to configure the particular location or recommendation slot 502.

Figure 6:
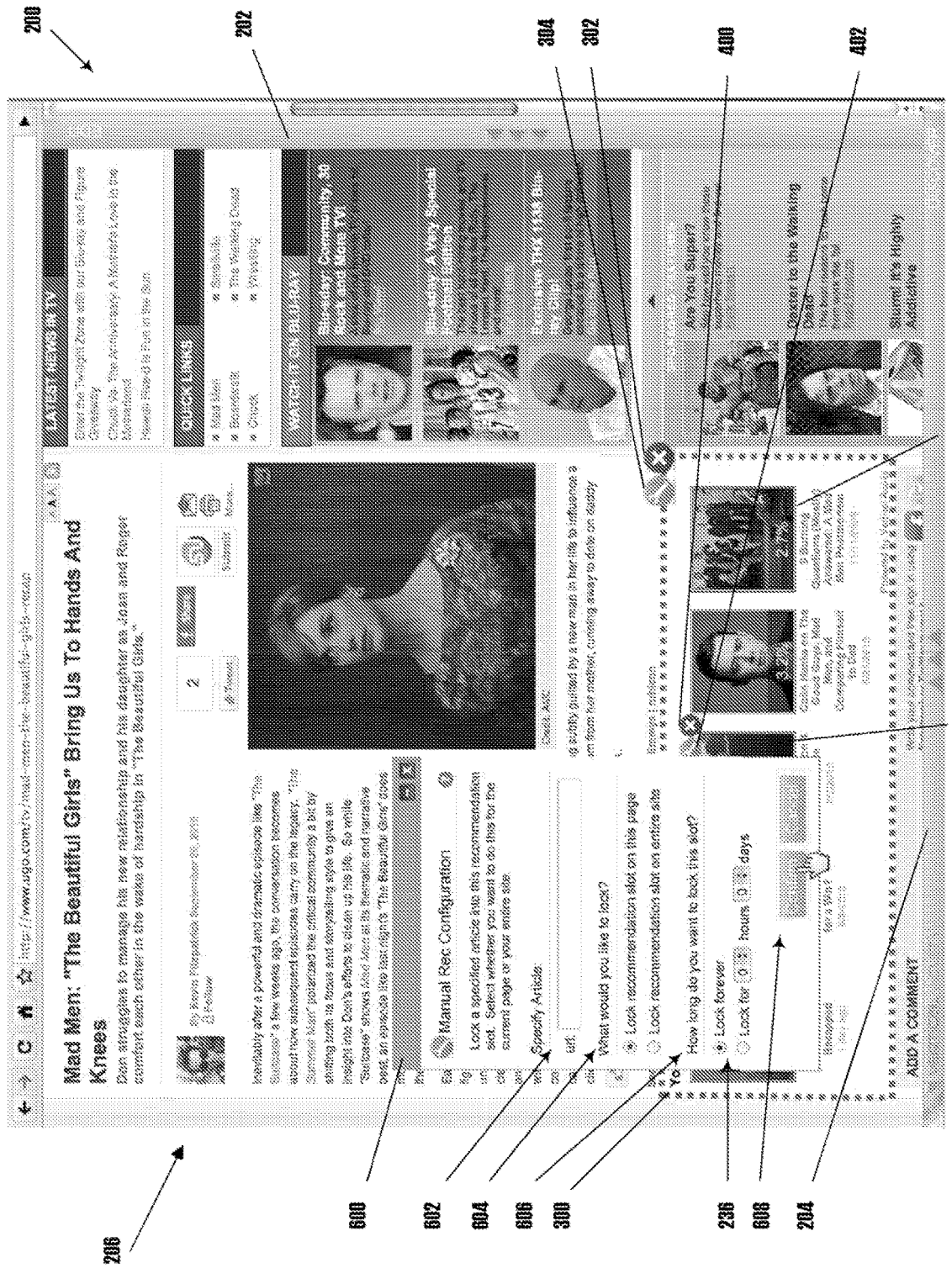

In FIG. 6, after a user, such as 172, selects the individual configuration tool 504 for the particular location or recommendation slot, such as 502, of a recommended article, such as 206D, a window 600 can pop-up to provide additional configuration commands for the user 172. In this example, the additional configuration commands can include options 602 to specify a URL (uniform record locator) or other location information for the particular recommended article or content to be locked into a particular location or recommendation slot in the webpage or the website. Additional configuration commands can include options 604 to lock or unlock the particular location or recommendation slot on the webpage and/or webpage. Other configuration commands can include options 606 to lock the particular location or recommendation slot forever or for a particular duration measured in hours and/or days. Using the input device, such as a mouse or touch screen, the user 172 can select one or more options 602, 604, 606 with configuration commands for the particular location or recommendation slot 502 of the article 206D. Using a confirmation button 608 or cancel button, the user 172 can submit or cancel the option and command selections. When options 602, 604, 606 with configuration commands for the particular location or recommendation slot, such as 502, of the recommended article, such as 206D, are selected and confirmed by the user 172, the curating application program 120 can implement the desired configuration commands with respect to the particular location or recommendation slot 502 of the recommended article 206D. For example, the curating application program 120 can generate or associate certain configuration attributes and code corresponding with the selected configuration commands for the particular location or recommendation slot 502 of the recommended article 206D, and the attributes and code can be stored in a memory, such as 116, or another data storage device for subsequent retrieval or reference.

Figure 7:
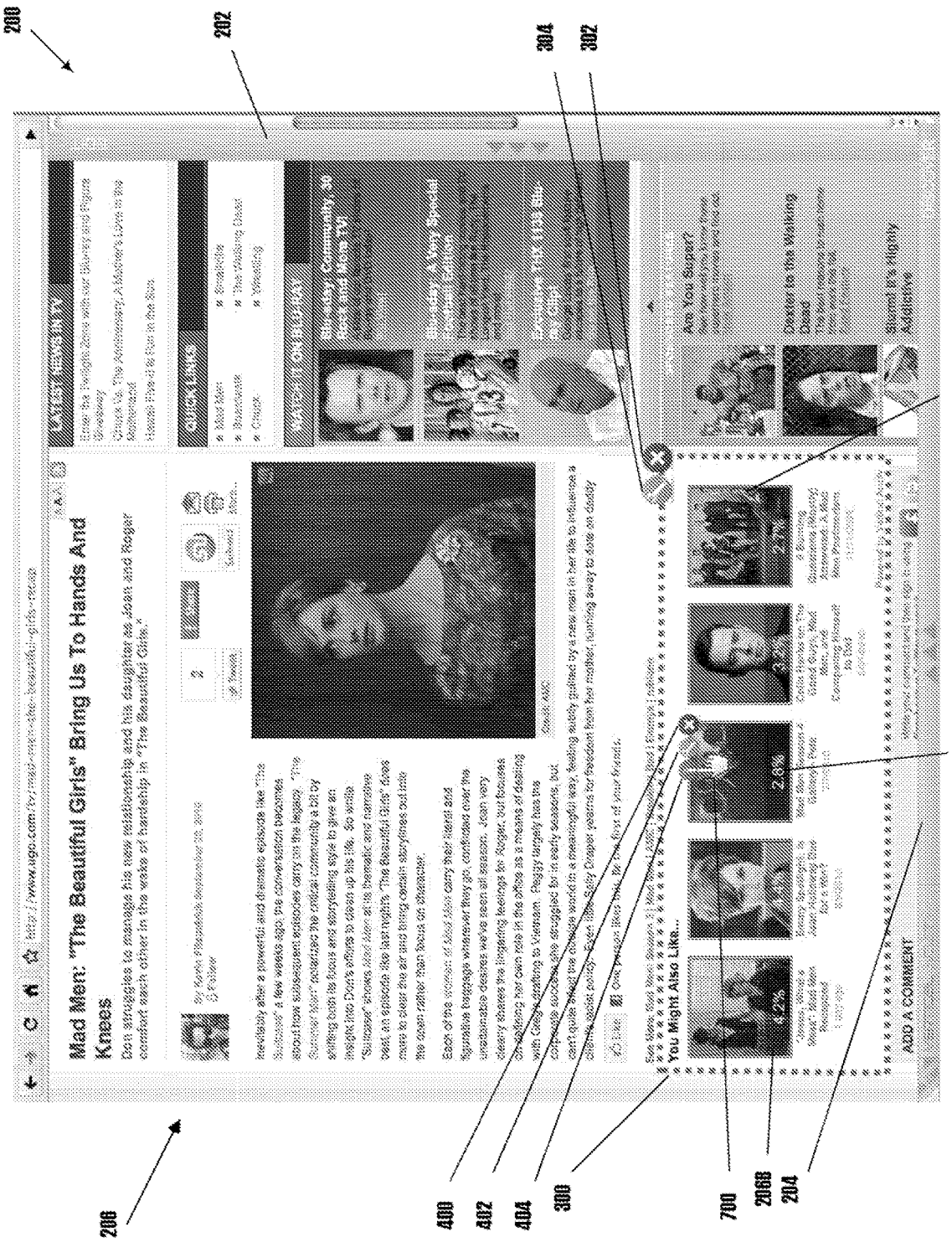

In FIG. 7, a user 172 may desire to obtain recommendation statistics for a particular recommended article, such as 206D. Such statistics may be useful for the user to understand and gauge, for instance, the relevance and/or popularity of the recommended article. In this example, the user 172 may select the individual information tool 508 using an input device or an indicator, such as 700, to obtain recommendation statistics for the particular recommended article 206D.

Figure 8:
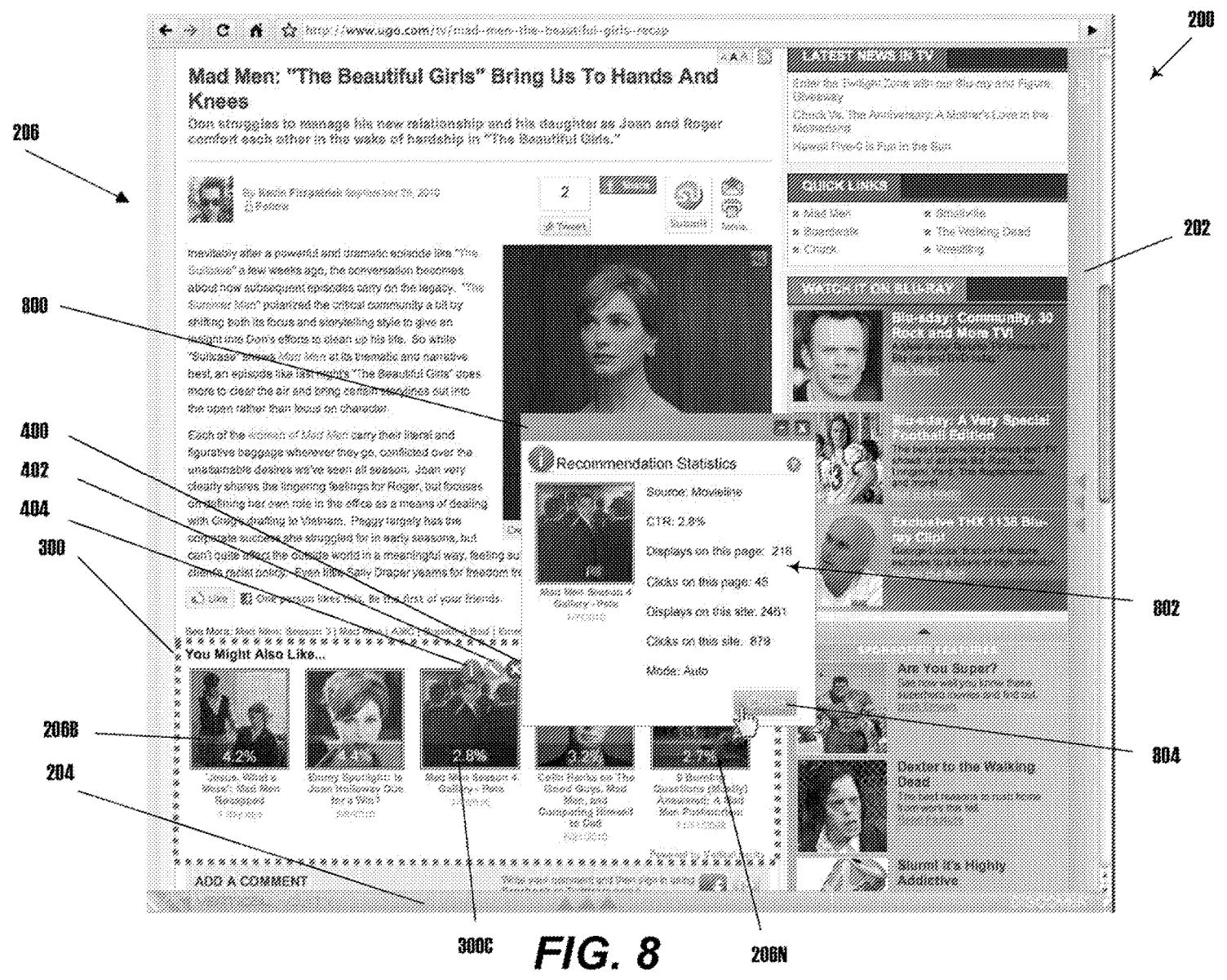

In FIG. 8, after a user, such as 172, selects the individual information tool 508 for the particular recommended article, such as 206D, a window 800 can pop-up to provide statistics for the user 172. In this example, the statistics 802 can include CTR (clickthrough rate), number of displays on a particular webpage, number of clicks on a particular webpage, number of displays on a particular website, number of clicks on a particular website, a statistical source name, and a type of statistical collection mode (e.g., auto). Systems and methods for measuring, collecting, and tracking metrics and/or statistics for various content are described in co-pending U.S. application Ser. Nos. 12/367,968 and 12/647,304. In other embodiments, other statistics can be displayed, collected, or otherwise obtained. In any instance, the curating application program 120 can generate or obtain certain statistical attributes corresponding with the statistics shown for the particular recommended article, such as 206D, and the attributes can be determined by the curating application program 120 or otherwise obtained from a memory, such as 116, or other data storage device, such as a database 160-170 in FIG. 1. Using the input device, such as a mouse or touch screen, the user 172 can select a close button 804 to close the window 800.

Figure 9:
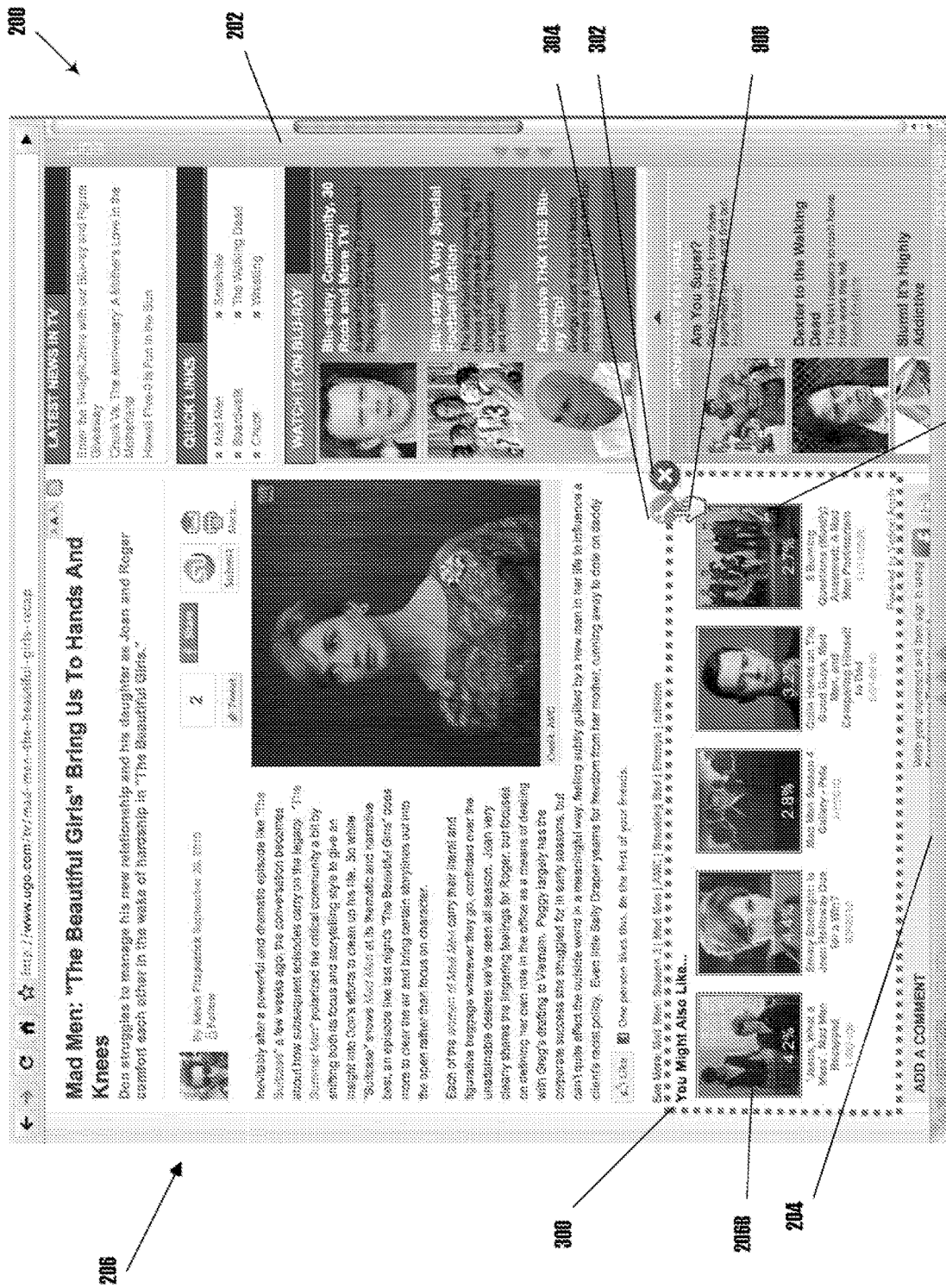

In FIG. 9, a user 172 may desire to select the group configuration tool 304 for a particular series of recommended articles, such as 206B-206N, or other content. In this manner, the user 172 can configure the recommendations for a particular location or position on a webpage and/or website for a series of recommended articles, or other content. In this example, the user 172 may select the group configuration tool 304 using an input device or an indicator, such as 900, to obtain group configuration commands for the series of recommended articles, such as 206B-206N, or other content.

Figure 10:

In FIG. 10, after a user, such as 172, selects the group configuration tool 304 for the particular location or position of series of recommended articles, such as 206B-206N, or other content, a window 1000 can pop-up to provide additional configuration commands for the user 172. In this example, the additional configuration commands can include options 1002 to designate any number of source articles to be recommended from the user's webpage or website, and from a source of syndicated or third party articles. Additional configuration commands can include options 1004 to set the selection of any number of articles based on the recency or publication of the article. Other configuration commands can include options 1006 to select any number of articles to be recommended based on relatedness to the primary article, such as 206A, or other content. Using the input device, such as a mouse or touch screen, the user 172 can select one or more options 1002, 1004, 1006 with configuration commands for the particular location, position, or recommendation slot 502 of the article 206D. Using a confirmation button 608 or cancel button, the user 172 can submit or cancel the option and command selections. When options 1002, 1004, 1006 with configuration commands for the particular location or position of the series of recommended articles, such as 206B-206N, or other content, are selected and confirmed by the user 172, the curating application program 120 can implement the desired configuration commands with respect to the particular location or position of series of recommended articles, such as 206B-206N, or other content. For example, the curating application program 120 can generate or associate certain configuration attributes and code corresponding with the selected configuration commands for the particular location or position in the webpage and/or website for the series of recommended articles, such as 206B-206N, or other content, and the attributes and code can be stored in a memory, such as 116, or another data storage device for subsequent retrieval or reference.

Figure 11:
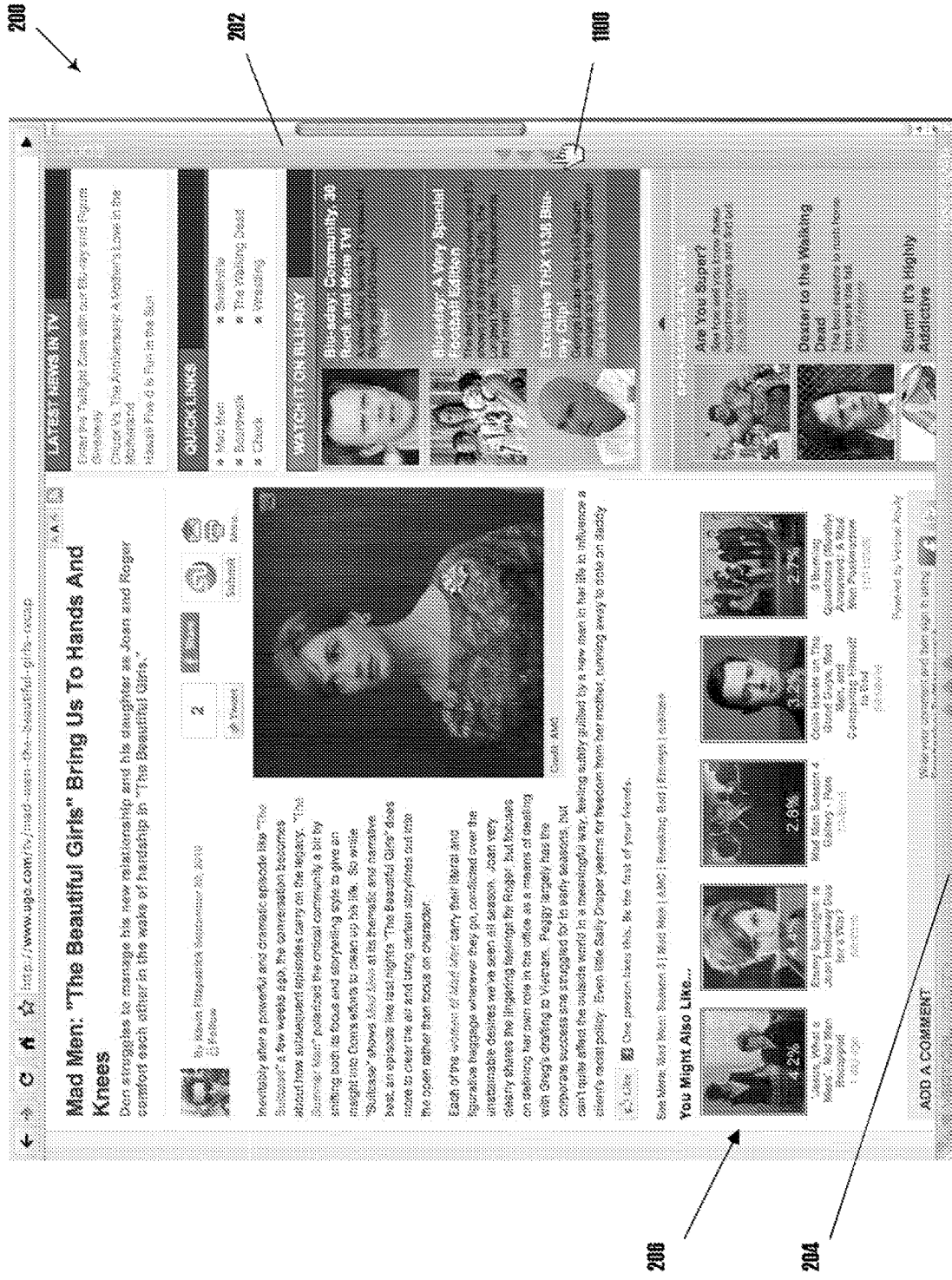

In FIG. 11, a user, such as 172 in FIG. 1, may desire to edit, modify, or add to the content on a particular webpage and/or website. The editing functionality provided by the system, such as 100 in FIG. 1, can facilitate selection of particular aggregated or stored content, and can further facilitate the user's placement or positioning of the selected content in a desired webpage or website of interest. Using an input device, such as a mouse or touch screen, the user 172 can use an indicator 1100 to select the edit command bar 202 along one vertical side of the window, for instance the right side of the user interface 200.

Figure 12:
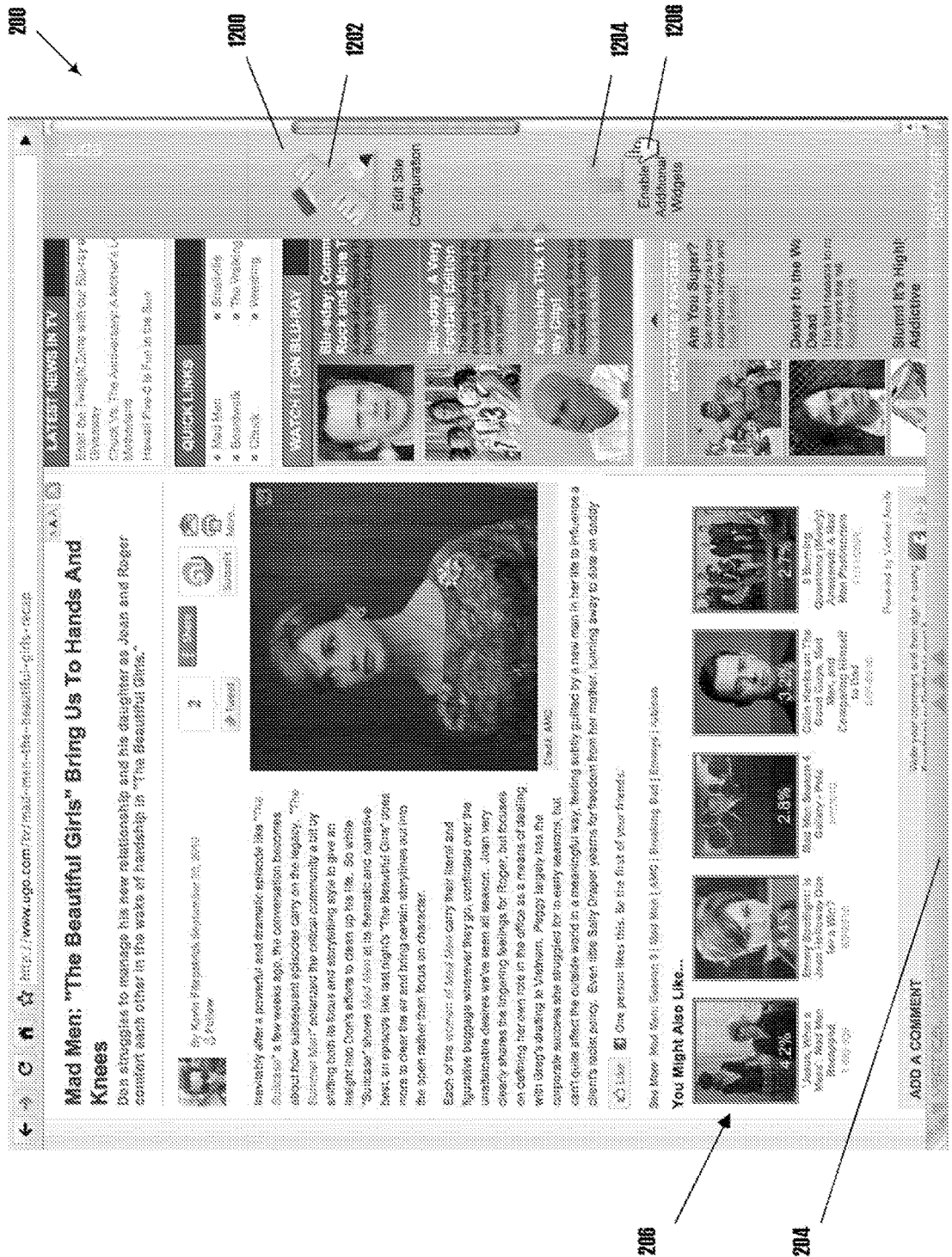
Figure 13:
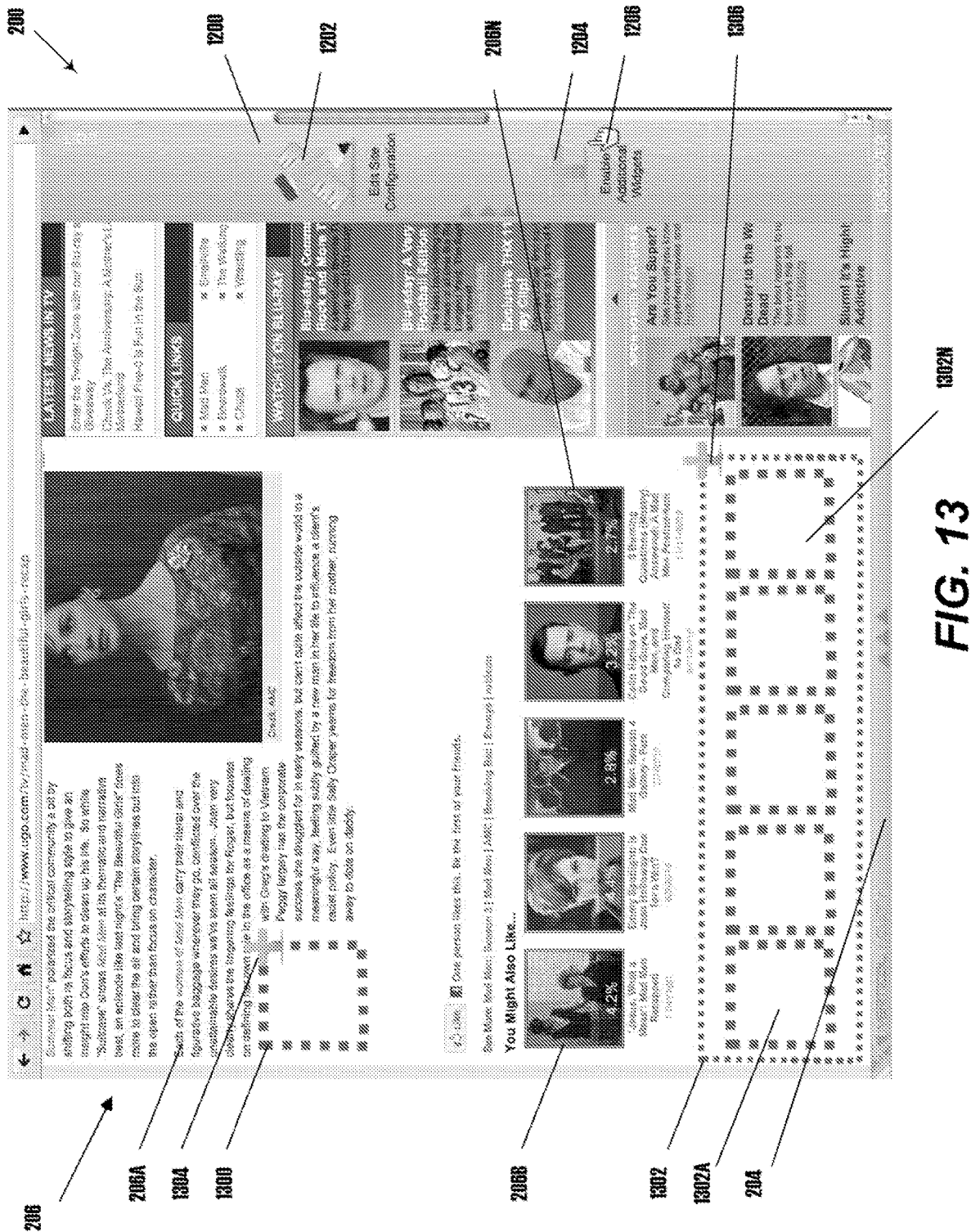

In FIG. 12, after a user, such as 172, selects the edit command bar 202, the curating application program 120 can open an expanded edit command bar 1200 in the user interface 200 to provide additional editing commands for the user 172. In this example, the additional editing commands can include an option 1202 to edit the site configuration. Additional editing commands can include an option 1204 to enable additional widgets or content blocks. Using the input device, such as a mouse or touch screen, the user 172 can select one or more options 1202, 1204 with editing commands for the particular webpage or website.

Using the option 1202 to edit the site configuration, the user 172 can input one or more site configuration parameters to control. For example, a user can control or otherwise set one or more website and/or webpage parameters for displaying particular content on the website and/or webpage including, but not limited to, which website or webpage sections to display recommendation content, the number of recommendations to show in a content or recommendation block, and the third party source or sources for candidate recommendation content. For example, using option 1212, a user can select site configuration commands corresponding with "show four recommendations from www.movieline.com and www.variety.com on all 'Reviews' section pages." Additional site configuration parameters and commands can be implemented for a particular content or recommendation block including, but not limited to, maximum age of a recommended article, minimum relatedness with the hosting article, number of times a recommendation can be viewed, and type of content (e.g., video). In certain embodiments, a link to a webpage and/or content can be inserted in a recommendation or content block instead of a representative thumbnail.

In any instance, when option 1202 with editing commands for the particular webpage or website are selected and confirmed by the user 172, the curating application program 120 can implement the desired editing commands with respect to the particular webpage or website. For example, the curating application program 120 can generate or associate certain site configuration attributes and code corresponding with the selected site configuration commands for the particular webpage or website, and the attributes and code can be stored in a memory, such as 116, or another data storage device for subsequent retrieval or reference.

Using the option 1204 to enable additional widgets or content blocks, the user 172 can create a new widget or content block within the webpage or website of interest. For example, after the user 172 selects the option 1204 to enable additional widgets or content blocks, the curating application program 120 can generate one or more new content blocks 1300, 1302 in particular locations or positions of the webpage or website of interest. In the example shown in FIG. 13, a first content block generated by the curating application program 120 can be an embedded-type block 1300 within the primary article 206A, for instance, in a corner of the primary article 206A. The embedded-type content block 1300 shown in FIG. 13 can accommodate a single recommended article, but in other embodiments, additional articles or content can be accommodated. An icon 1304 in the upper right corner of the embedded-type content block 1300 can permit a user to activate the content block or widget. A second content block generated by the curating application program 120 can be series-type content block 1302 adjacent to, for instance, below the primary article 206A. The series-type content block 1302 shown in FIG. 13 can accommodate multiple recommended articles in locations, such as 1302A-1302N, but in other embodiments, fewer or greater numbers of articles or content can be accommodated. An icon 1306 in the upper right corner of the embedded-type content block 1300 can permit a user to activate the content block or widget. Processes for selecting recommended articles or content for new content blocks 1300, 1302 as well as existing content blocks are described below with respect to FIGS. 14-19. In any instance, when option 1204 in FIG. 12 to enable additional widgets or content blocks is selected by the user 172, the curating application program 120 can generate the desired new widgets or content blocks in the desired locations or positions with respect to the particular webpage or website of interest. For example, the curating application program 120 can generate new widget attributes and associated code corresponding with the new added widget commands for the particular webpage or website, and the attributes and associated code can be stored in a memory, such as 116, or another data storage device for subsequent retrieval or reference.

In FIG. 14, a user, such as 172 in FIG. 1, may desire to select new content for a particular webpage and/or website. The selection functionality provided by the system, such as 100 in FIG. 1, can facilitate selection of particular aggregated or stored content, and can further facilitate the user's placement or positioning of the selected content in a desired webpage or website of interest. Using an input device, such as a mouse or touch screen, the user 172 can use an indicator 1400 to select the discover command bar 204 along one vertical side of the window, for instance the lower side of the user interface 200.

Figure 15:
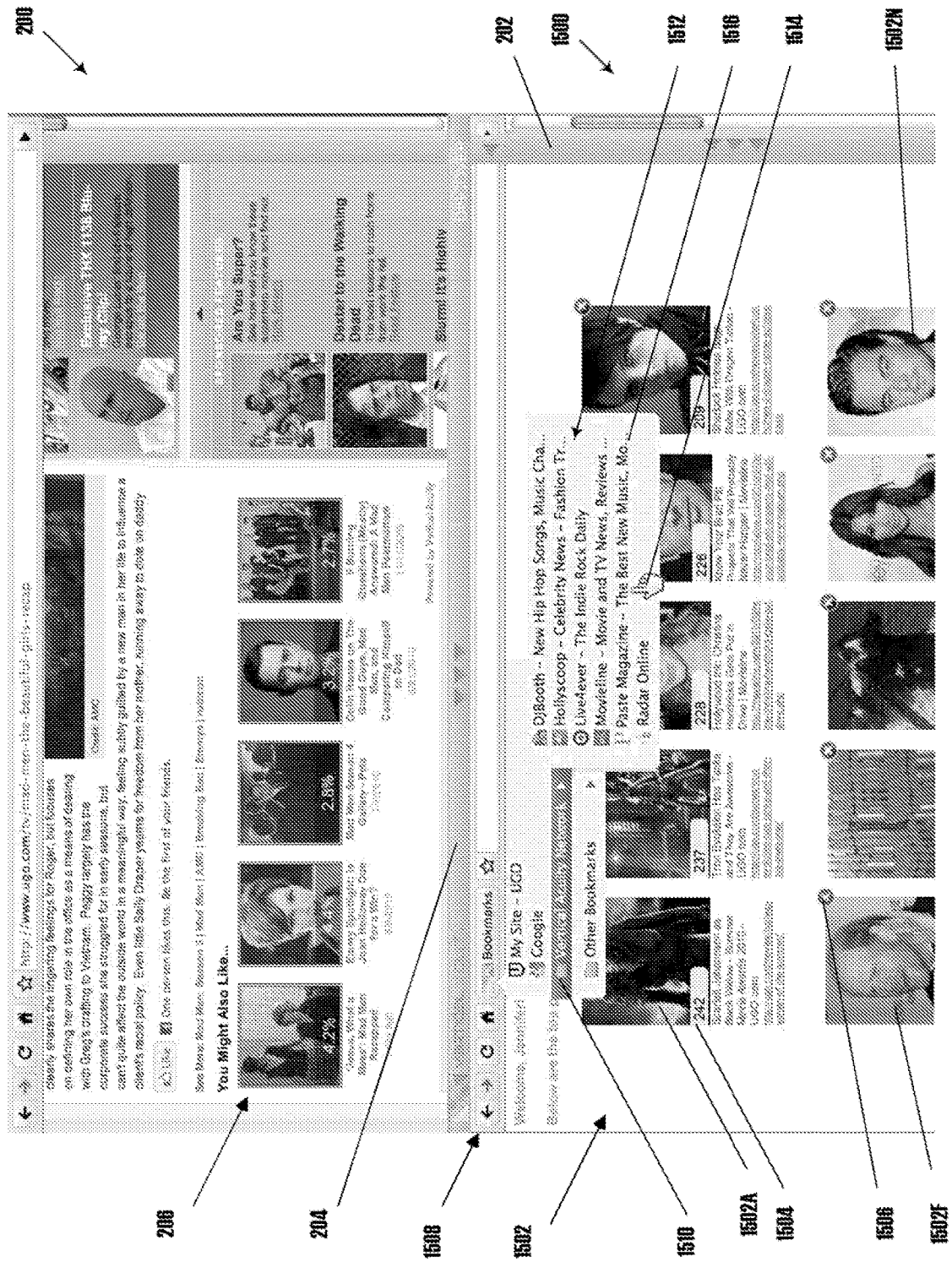

In FIG. 15, after a user, such as 172, selects the discover command bar 204, the curating application program 120 in FIG. 1, operating in conjunction with the browser application program 118, can open a new selection window 1500 with the discover command bar 204 positioned between the original content 206 and selectable new content 1502 displayed in the new selection window 1500. The edit command bar 202 can be maintained along one vertical side of the user interface 200 adjacent to the new selection window 1500. Other embodiments can provide different selection window options such as a pop-up window or other window in which both a portion of the original content and a portion of the selectable new content 1502 can be simultaneously viewed by the user 172. In the example shown in FIG. 15, the selectable new content 1502 can be a series of articles 1502A-1502N represented as thumbnail images, each with an associated title and link or location information.

As previously described above, a curating application program, such as 120, can automatically curate content by selecting certain content for a particular user. The curating application program 120 can, by way of any number of machine learning algorithms or other algorithms, identify relatively popular or frequently selected or viewed content by similar users. In certain embodiments, regression-type, supervised, unsupervised, and/or reinforced learning algorithms that can analyze any number of attributes of content in conjunction with a user or editor's prior content selections or selections of like-minded editors can be implemented by a curating application program, such as 120, to automatically curate content. In other embodiments, the system 100 may classify one or more users by vertical or other subject matter, and compare the content sources each of the users visits or otherwise uses as compared to similarly situated users. Other algorithms and techniques for identifying relatively popular or frequently selected or viewed content are described in co-pending U.S. application Ser. Nos. 12/367,968 and 12/647,304. In the embodiment shown in FIG. 15, content of interest such as selectable new content 1502 may be identified based at least in part on users with similar characteristics viewing and/or selecting certain content, such as users selecting entertainment-related content for entertainment-related webpages and/or websites. For example, if a majority of the other users are viewing and/or selecting common content, the common content can be identified, highlighted, and output by the curating application program 120 as selectable new content, such as 1502. Other characteristics can include, but may include, job title, publication or media genre, age, interest, geographic location, or other identifying characteristic.

In any instance, the selectable new content can include, but is not limited to, articles, webpage, website, documents, blog, blog posts, messages, tweets, emails, videos, files, graphics, images, or other electronic data. An identification code or other identifier, such as 1504, provided by the curating application program 120 for each article 1502A-1502N can be displayed adjacent to or overlaying a portion of the respective article 1502A-1502N. Other systems and methods for aggregating and syndicating content for user selection and/or recommendation are described in co-pending U.S. application Ser. Nos. 12/367,968 and 12/647,304. In this manner, a user such as 172 can select one or more of the articles, such as 1502A-1502N, for placement as recommended content in a particular website or webpage of interest.

The curating application program 120 can also provide a deletion tool 1506, which can be displayed as an icon in the upper right corner of each article, such as 1502F, for deletion of the particular article from the selection window 1500, if desired by the user 172.

Using one or more tools from a browser application program tool bar 1508 positioned adjacent to the selection window 1500, a user, such as 172, can use an input device, such as a mouse or touch screen, to browse and select from one or more webpages, websites, folders, or links to access previously aggregated or otherwise stored content. In the example shown in FIG. 15, a user can select a folder, such as the "Vertical Acuity Network" folder 1510, which may contain one or more webpages, websites, folders, or links 1512 to access previously aggregated or otherwise stored content in a particular network or data storage device, such as the "Vertical Acuity Network" or a data storage device. In certain instances, the curating application program, such as 120, operating alone or in conjunction with the browser application program, such as 118, can utilize proxy functionality to permit access to an original third party webpage, such as 124A, 124B, and associated content, such as 126A, 126B, at a content provider 106A and/or website host server 108A. In other instances, the curating application program, such as 120, operating alone or in conjunction with the browser application program, such as 118, can utilize browsing technology to permit access to previously aggregated or otherwise stored content, such as 126C, and webpages, such as 124C, in a particular network or data storage device, such as host server 110. In any instance, when desired content is located, the user 172 can use the input device to manipulate an indicator, such as 1514, to select a particular webpage, website, folder, or link to access previously aggregated or otherwise stored content in a particular network or data storage device, such as a link 1516 to a previously stored article in "Paste Magazine." Thus, through the proxy functionality provided, the desired original third party webpage, article, and/or content can be viewed by the user on the actual third party website and/or webpage prior to selection for editing, copying, and/or pasting. Likewise, through the browser functionality provided, the desired webpage, article, and/or content at the particular network or data storage device can be viewed by the user prior to selection for editing, copying, and/or pasting.

Figure 16:

In FIG. 16, after a user, such as 172, selects a particular webpage, website, folder, or link to access previously aggregated or otherwise stored content, such as 1516, the curating application program 120 in FIG. 1, operating in conjunction with the browser application program 118, can open the link 1516 and display the selected webpage, article, and/or content 1600 in the new selection window 1500. The selected content location, such as a http (hypertext transfer protocol) address 1602, may also be displayed in the new selection window 1500. Similar to described above, the edit command bar 202 can be maintained along one vertical side of the user interface 200 adjacent to the new selection window 1500. In one example, the selected content 1600 can be an original third party webpage, content, or article from a third party website. If the selected content 1600 is an original third party webpage, content, or article, the user 172, by way of the curating application program 120, can use proxy functionality to browse the selected content 1600 on the original third party website. While browsing using the proxy functionality of the curating application program 120, the user 172 may decide whether to select the webpage, content, or article of interest for placement as recommended content in a particular desired website or webpage.

In another example, the selected content 1600 can be previously stored aggregated content stored in a memory or data storage device, such as a host server 110A or database 160-170. The user, by way of the curating application program 120, can use browsing functionality to browse the selected content 1600 in a memory or data storage device, such as a host server 110A or database 160-170. While browsing using the browsing functionality of the curating application program 120, the user 172 may decide whether to select the webpage, content, or article of interest for placement as recommended content in a particular desired website or webpage.

In any instance, when the selected content 1600 is acceptable to the user, such as 172, the user 172 can use an input device, such as a mouse or touch screen, to manipulate an indicator 1604 to select the edit command bar 202 along one vertical side of the window in the user interface 200.

Figure 17:

In FIG. 17, after a user, such as 172, selects the edit command bar 202, the curating application program 120 can open an expanded selection edit command bar 1700 adjacent to the new selection window 1500 to provide additional selection editing commands for the user 172. In this example, the additional selection editing commands can include an option 1702 to drag and drop the selected webpage, article, or content of interest. Additional selection editing commands can include an option 1704 to add to automated recommendations. Yet other additional selection editing commands can include an option 1706 to copy a shortcut. Using the input device, such as a mouse or touch screen, the user 172 can select one or more options 1702, 1704, 1706 with selection editing commands for the particular selected webpage, article, or content of interest.

Using the option 1702 to drag and drop the selected webpage, article, or content of interest, the user 172 can select a position for the webpage, article, or content of interest in a particular desired webpage or website as shown and described below in FIGS. 18 and 19. When option 1702 with selection editing commands for the particular webpage, article, or content of interest is selected and confirmed by the user 172, the curating application program 120 can implement the desired selection editing commands with respect to the particular webpage, article, or content of interest. For example, the curating application program 120 can generate or associate certain content location attributes and code corresponding with the selected selection editing commands for the particular webpage, article, or content of interest, and the attributes and code can be stored in a memory, such as 116, or another data storage device for subsequent retrieval or reference. In one example, if the selected webpage, article, or content of interest is from an original third party website, the curating application program 120 can access a previously stored, corresponding webpage and/or content in a data storage device, and can provide user access to the previously stored, corresponding webpage and/or content in the data storage device. In this manner, access to the original third party content stored on the third party website and/or webpage can be strictly controlled or otherwise limited. In another example, if the selected webpage, article, or content of interest is a previously stored or otherwise aggregated webpage and/or content, the curating application program 120 can provider user access directly to the data storage device the previously stored or otherwise aggregated webpage and/or content is stored in.

Using the option 1704 to add to automated recommendations, the user 172 can add the selected webpage, article, or content of interest to the automated recommendations considered for the desired webpage or website as shown and described below in FIG. 20. When option 1704 with selection editing commands for the particular webpage, article, or content of interest is selected and confirmed by the user 172, the curating application program 120 can implement the desired selection editing commands with respect to the particular webpage, article, or content of interest. For example, the curating application program 120 can generate or associate certain recommendation attributes and code corresponding with the selected selection editing commands for the particular webpage, article, or content of interest, and the attributes and code can be stored in a memory, such as 116, or another data storage device for subsequent retrieval or reference. Systems and methods for syndicating, recommending, and selecting content are described in co-pending U.S. application Ser. Nos. 12/367,968 and 12/647,304.

Using the option 1706 to copy a shortcut, the user 172 can generate and copy a shortcut or link to the selected webpage, article, or content of interest as shown and described below in FIG. 21. When option 1706 with selection editing commands for the particular webpage, article, or content of interest is selected and confirmed by the user 172, the curating application program 120 can implement the desired selection editing commands with respect to the particular webpage, article, or content of interest. For example, the curating application program 120 can generate or associate certain shortcut attributes and code corresponding with the selected selection editing commands for the particular webpage, article, or content of interest, and the attributes and code can be stored in a memory, such as 116, or another data storage device for subsequent retrieval or reference.

Figure 18:

FIG. 18 illustrates a user, such as 172, using an input device, such as a mouse or touch screen, selecting the option 1702 to drag and drop an article. The curating application program 120 can generate or otherwise obtain a corresponding option icon 1800, which the user 172 can drag or otherwise manipulate on the user interface 200 using the input device. As the user drags the option icon 1800 towards the desired position or location 1802 for the webpage, article, or content of interest, the curating application program 120 can display the option icon 1800 on the user interface 200 along the path 1804 between the edit command bar 1602 and the desired position or location 1802 for the webpage, article, or content of interest. In this example, the desired position or location 1802 is adjacent to the primary article 206A of the webpage or website displayed in the upper portion of the user interface 200. When the user 172 is satisfied with the initial placement of the webpage, article, or content of interest in the desired position or location 1802 relative to the primary article 206A, the user 172 can release the option icon 1800 using the input device, and the curating application program 120 can display the option icon 1800 on the user interface 200 over the desired position or location 1802 relative to the primary article 206A.

In this example, a window 1806 can pop-up to provide additional selection editing commands for the user 172. In this example, the additional selection editing commands can include an option 1808 to lock the position of the selected webpage, article, or content of interest in a particular webpage or website for a particular duration, such as for 30 days, or until the user desires to remove it. Using the input device, such as a mouse or touch screen, the user 172 can confirm, using options 1810, applying the selection editing commands for the webpage or for the website. When options 1808, 1810 with selection editing commands for the selected webpage, article, or content of interest in a particular webpage or website are selected and confirmed by the user 172, the curating application program 120 can implement the desired selection editing commands with respect to the particular selected webpage, article, or content of interest in a particular webpage or website. For example, the curating application program 120 can generate or associate certain selection editing attributes and code corresponding with the selected selection editing commands for the selected webpage, article, or content of interest in a particular webpage or website, and the attributes and code can be stored in a memory, such as 116, or another data storage device for subsequent retrieval or reference.

Figure 19:

In FIG. 19, after a user, such as 172, selects selection editing commands, such as a duration and position or location, for the particular selected webpage, article, or content of interest in a particular webpage or website, the curating application program 120 in FIG. 1, operating in conjunction with the browser application program 118, can generate or obtain, and display a representative thumbnail 1900 with the article title and recency information of the selected webpage, article, or content of interest adjacent to the primary content 206A. In this manner, a user such as 172 can view the selected webpage, article, or content of interest as a recommended article in a desired webpage or website.

Figure 20:
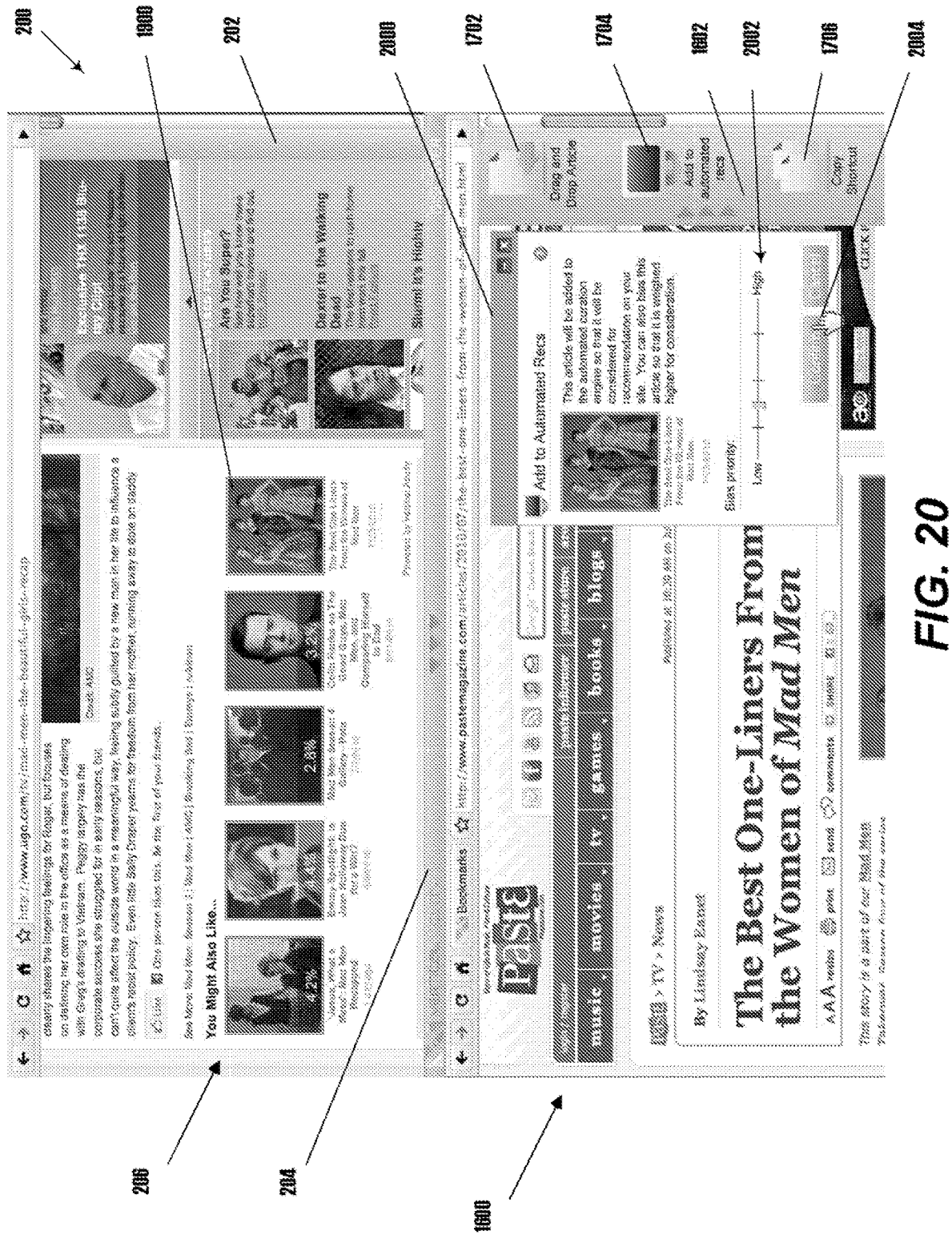

FIG. 20 illustrates a user, such as 172, using an input device, such as a mouse or touch screen, selecting the option 1704 to add a selected webpage, article, or content of interest to automated recommendations. In this example, a window 2000 can pop-up to provide additional selection editing commands for the user 172. The additional selection editing commands can include an option 2002 to select a relative bias priority, for instance, low to high, wherein the selected webpage, article, or content of interest can be weighted accordingly for automated selection as a recommended article. Using the input device, such as a mouse or touch screen, the user 172 can set the relative bias priority for the selected webpage, article, or content of interest using option 2002. The user 172 can submit or cancel the option and command selections using a respective confirmation button 2004 or cancel button. When option 2002 is set for the particular selected webpage, article, or content of interest and confirmed by the user 172, the curating application program 120 can implement the desired bias priority commands with respect to the particular selected webpage, article, or content of interest. For example, the curating application program 120 can generate or associate certain bias priority attributes and code corresponding with the selected bias priority commands for the particular selected webpage, article, or content of interest, and the attributes and code can be stored in a memory, such as 116, or another data storage device for subsequent retrieval or reference.

Figure 21:

FIG. 21 illustrates a user, such as 172, using an input device, such as a mouse or touch screen, selecting the option 1706 to copy or generate a shortcut for a selected webpage, article, or content of interest. In this example, a window 2100 can pop-up to provide additional selection editing commands for the user 172. The additional selection editing commands can include an option 2102 to select an image size, such as 90 by 90 pixels, for a representative thumbnail to be generated as a shortcut for the selected webpage, article, or content of interest. Another additional selection editing command can include an option 2104 to transmit the shortcut, such as via email or by copying the shortcut or other content to a clipboard. Using the input device, such as a mouse or touch screen, the user 172 can set the image size and transmission options for a shortcut to the selected webpage, article, or content of interest using options 2102, 2104. The user 172 can submit or cancel the option and command selections using a respective confirmation button 2106 or cancel button. When options 2102, 2104 are set for the shortcut to the particular selected webpage, article, or content of interest and confirmed by the user 172, the curating application program 120 can implement the desired image size and transmission commands with respect to the shortcut for the particular selected webpage, article, or content of interest. For example, the curating application program 120 can generate or associate certain image size and transmission attributes and code corresponding with the selected image size and transmission commands for the particular selected webpage, article, or content of interest, and the attributes and code can be stored in a memory, such as 116, or another data storage device for subsequent retrieval or reference.

In any instance, the system 100 can automatically curate content for selection by a particular user, such as an editor, website designer, or publisher. Such content can be based on similar characteristics the user may have with other users. After a user, such as 172, has selected certain third party content for a webpage and/or website of interest, and is satisfied with the content selection for the webpage and/or website of interest, the user can instruct the system 100 to publish the webpage and/or website of interest with the selected content. The curating application program, such as 120, operating in alone or in conjunction with the browser application program, such as 118, can facilitate publication of the selected third party content on the webpage and/or website or otherwise make the selected third party content on the webpage and/or website accessible via a network, such as 102.

Figure 22:

Turning to FIG. 22, an example user interface 2200 for rating content is shown generated by a browser application program, such as 118 in FIG. 1, operating in conjunction with a rating application program, such as 122. The user interface 2200 can be used to rate content on one or more webpages or websites accessed by or otherwise viewed by a user. For example, the user interface 2200 shown can be a window with content including at least one article 2202. The rating application program 122 can generate and display a content rating bar 2204 with an aggregated rating 2206, a number of previously submitted ratings 2208, and a submit your rating command 2210. Typically, a user, such as a consumer or visitor, viewing the content is requested to rate content via the user interface 2200 and content rating bar 2204. Using an input device, such as a mouse or touch screen, the user can select the submit your rating command 2210 with an indicator, such as 2212. When selected, the submit your rating command 2210 can provide a set of rating indicators, shown as 2300 in FIG. 23, adjacent to the content of interest, for instance, 2202, which is desired to be rated for audience appropriateness.

Figure 23:

In FIG. 23, the set of rating indicators 2300 for rating content is shown generated adjacent to and below the content rating bar 2204. In this example, the set of rating indicators 2302 can be G, PG, PG-13, R, and NC-17, which are respectively designated 2302A-2302E, and the selected rating indicator in this example can be "PG-13." In other embodiments, other rating indicators can include, but are not limited to, all ages, parental guidance may be needed, not recommended for a younger audience, restricted to an older audience, adults only, E, EC, E10+, T, M, AO, RP, any motion picture rating certification, any entertainment software rating board certification, and any other media rating.

Using an input device, such as a mouse or touch screen, the user can manipulate an indicator such as 2304 to select one of the rating indicators, such as 2302C, to rate the content of interest, such as the article 2202, for audience appropriateness. After selecting a rating indicator, the rating application program 122 can receive a corresponding rating indication from the user's selection on the interface 2200, and the rating application program 122 can aggregate all received rating indications from one or more users for the content of interest, such as the article 2202. For example, the rating application program 122 can generate or associate certain rating attributes and code corresponding with the selected rating indicators for the particular content of interest, and the attributes and code can be stored in a memory, such as 144, or another data storage device for subsequent retrieval or reference.

To aggregate the scores, the rating application program 122 may perform an averaging process from all previously submitted scores, such as 28 other users in the embodiment shown in FIGS. 22-23, to determine an aggregated rating for the particular content of interest. In another embodiment, a rating application program, such as 122, may weight certain scores from certain users, such as trusted or reputable users, which can be used in an averaging process to determine an aggregated rating for the particular content of interest. In that embodiment, trusted or reputable users may be users who have previously rated content a predefined number of times or otherwise reliably rate content consistent with the determined aggregated rating, or may be users who are identified as having experience in rating content according to predefined rating measures. In any instance, the rating application program 122 can receive or obtain certain rating attributes corresponding with the received user rating indications for the particular rated content or article, and one or more aggregated rating attributes can be determined by the rating application program 122 for storage in a memory, such as 144, or other data storage device, such as a database 160-170 in FIG. 1, for subsequent retrieval or reference.

In one embodiment, a user, such as an editor, webpage designer, or publisher, may edit or otherwise view the rated content on the webpage and/or website. In this particular embodiment, when the user selects a recommendation statistics command for the rated content, shown as a representative thumbnail for the rated article, the rating application program, such as 122, can generate a pop-up window (similar to the window 800 described above in FIG. 8) to provide statistics which can include an audience appropriateness rating, CTR (clickthrough rate), number of displays on a particular webpage, number of clicks on a particular webpage, number of displays on a particular website, number of clicks on a particular website, a statistical source name, and a type of statistical collection mode (e.g., auto). In other embodiments, other statistics can be displayed, collected, or otherwise obtained, such as the number of users who selected each particular rating in a set of rating indicators, or the number of trusted or reputable users who rated the content of interest. The user, in this example, an editor, webpage designer, or publisher may utilize the aggregated rating to decide whether to select the particular rated content or article for further inclusion or recommendation in a webpage and/or website.

In any instance, a user such a consumer or visitor can rate content for audience appropriateness, and the rating application program, such as 120, operating in alone or in conjunction with the browser application program, such as 118, can generate an aggregated rating for the content based on rating indications from one or more users. Another user, such as an editor, webpage designer, or publisher can view the aggregated rating associated with the rated content when determining whether to select the rated content for use a recommended article or content.

Figure 24:
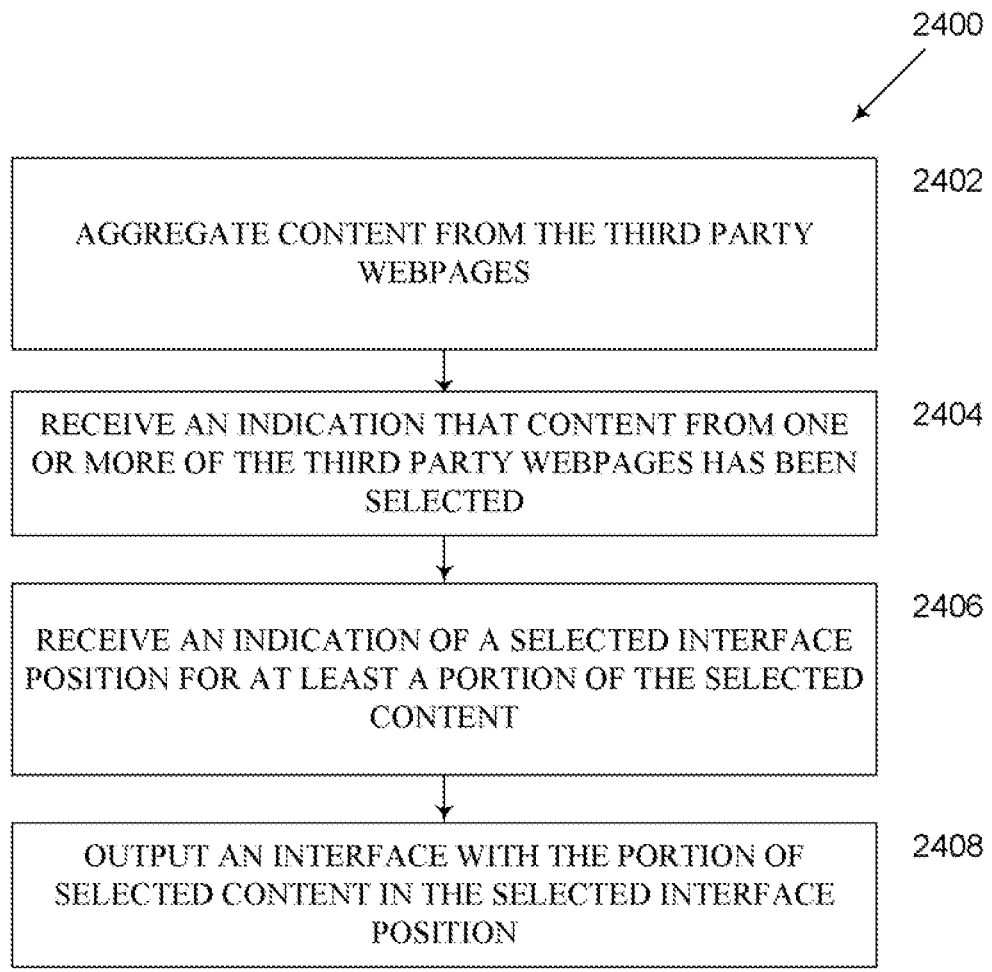
FIGS. 24-29 illustrate example methods in accordance with embodiments of the invention.
Figure 25:
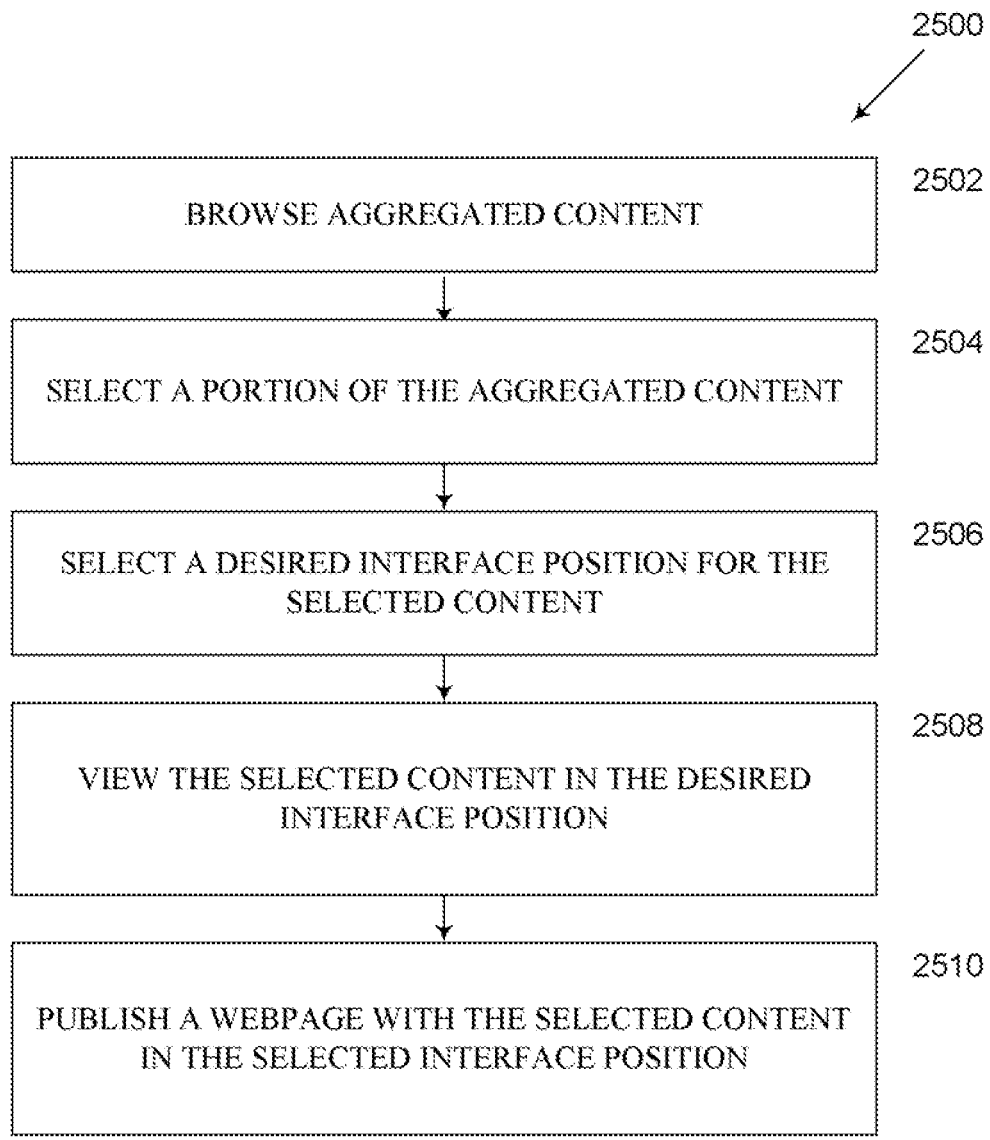
Figure 26:
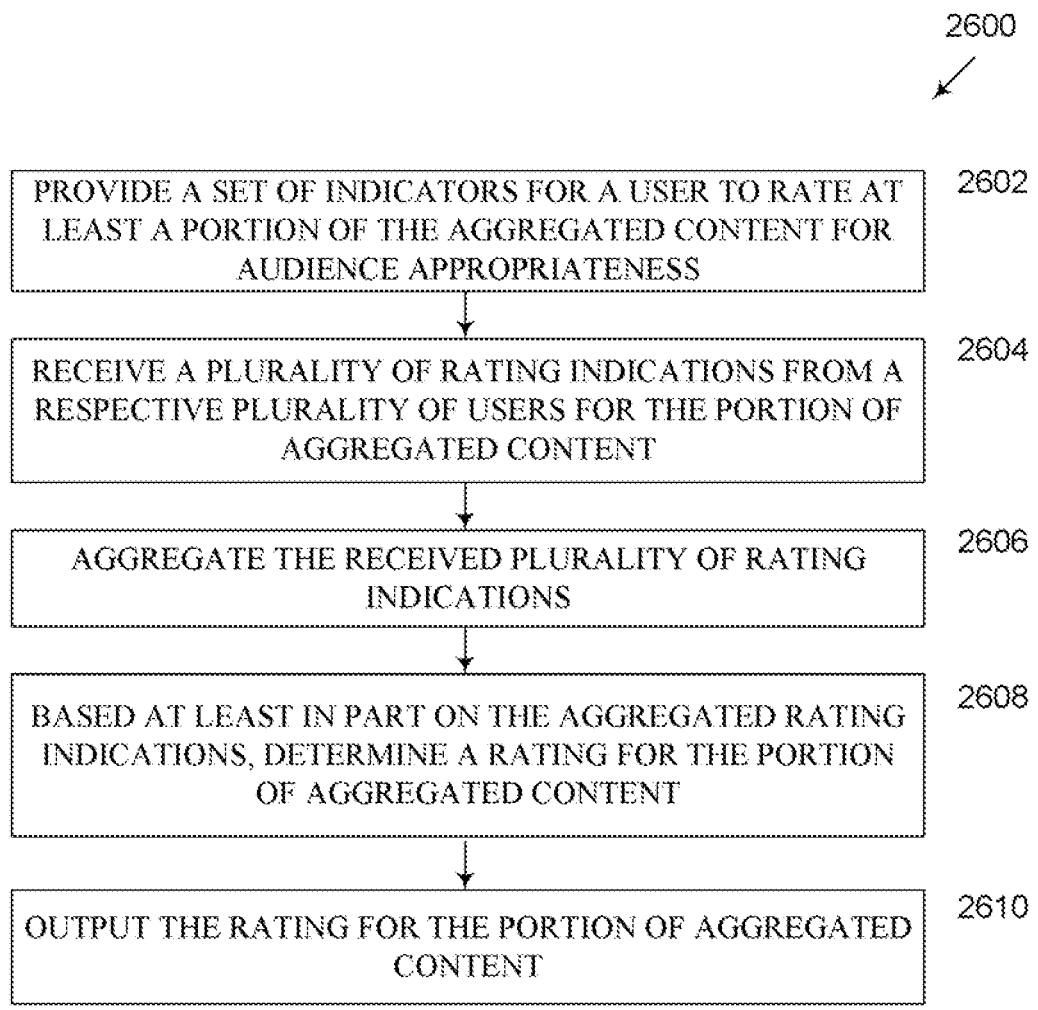
Figure 27:
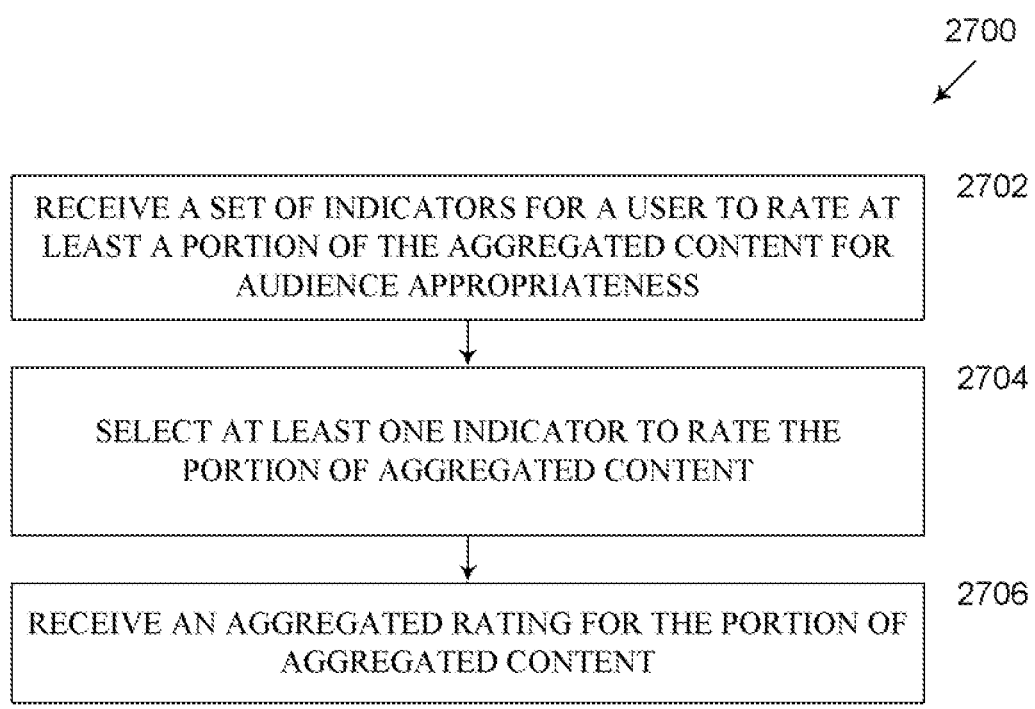
Figure 28:
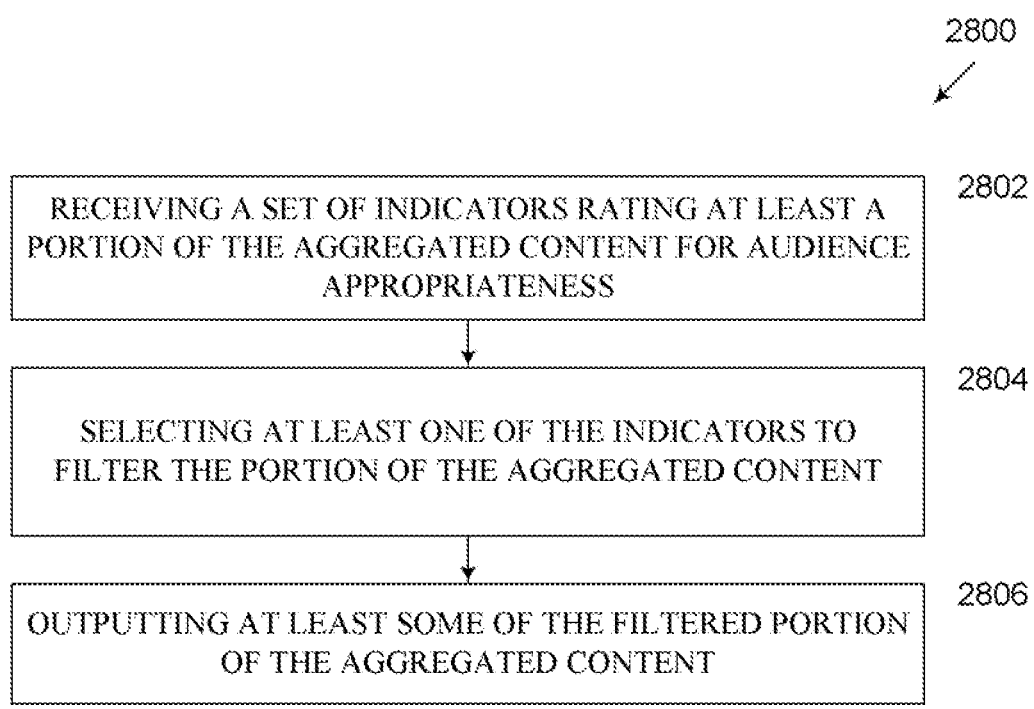
Figure 29:
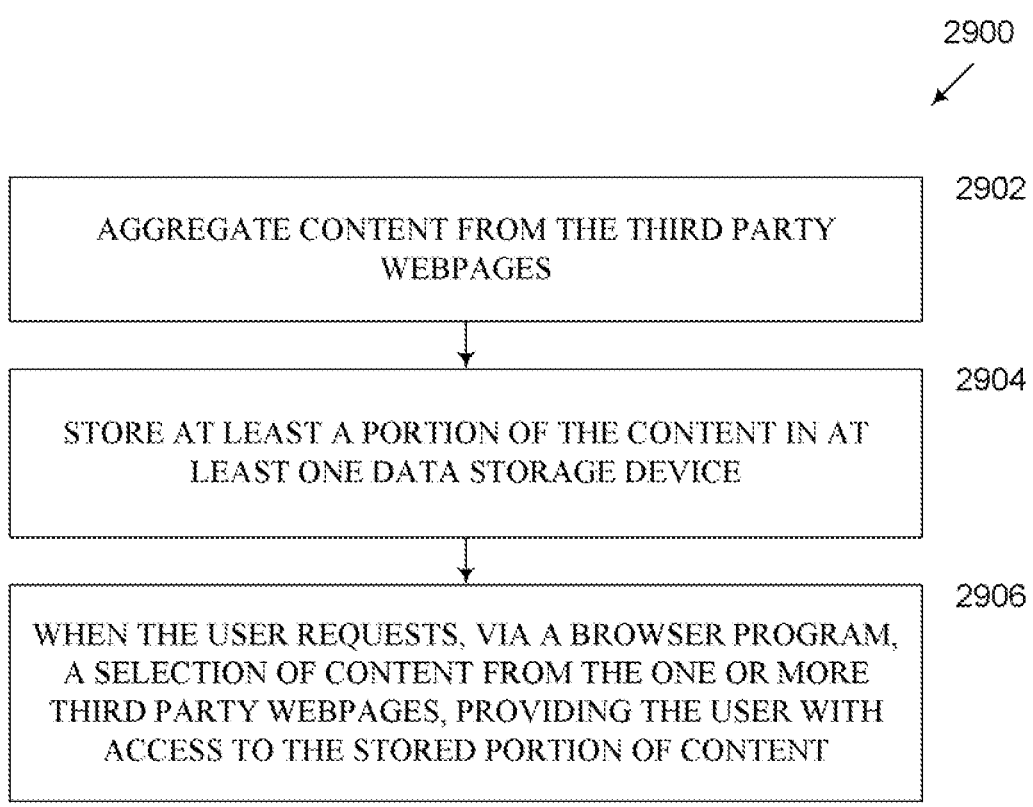

FIGS. 24-29 illustrate example methods according to embodiments of the invention. FIGS. 24 and 25 provide example methods for curating content in accordance with embodiments of the invention, FIGS. 26-28 provide example methods for rating content in accordance with embodiments of the invention, and FIG. 29 provides an example method for providing or otherwise presenting content in accordance with an embodiment of the invention.

FIG. 24 illustrates an example method for curating content according to an embodiment of the invention. The method 2400 begins at block 2402.

In block 2402, content is aggregated from third party webpages. In the embodiment shown in FIG. 24, a processor such as 114 or 142 in FIG. 1 and/or a data integration service module or engine such as 150 can aggregate data from one or more third party webpages, websites, blogs, accounts, or other online sources or data storage devices. In particular, data from one or more content providers, such as 106A-106N, and one or more databases or other data sources similar to 160-170 can be aggregated.

In one aspect on an embodiment, aggregating content from the third party webpages can include at least one of: storing content from the third party webpages in at least one data storage device, storing links to the third party webpages in at least one data storage device, or facilitating access to content from the third party webpages via at least one proxy tool.

In one aspect of an embodiment, aggregating content from the third party webpages can further include permitting a user to browse the aggregated content.

In one aspect of an embodiment, the method can include providing a drag and drop tool for a user to select content from the third party webpages and to select a desired interface position for the selected content.

In one aspect of an embodiment, the method can include providing an access control tool for a user to select at least one of the following criteria associated with the selected content: exclusion of the selected content from a webpage or a website, exclusion duration for the selected content, publication time for the selected content, and number of webpages to populate with the selected content.

In one aspect of an embodiment, the method can include providing a content filter tool for a user to filter selected content based at least in part on keyword, consumer preferences, consumer maturity or appropriateness ratings, or consumer popularity.

Block 2402 is followed by block 2404, in which an indication that content from one or more third party webpages has been selected. In the embodiment shown in FIG. 24, the processor such as 114 in FIG. 1 and/or the curating application program such as 120 can receive an indication from an input device, such as a mouse or touch screen, that a user has selected particular aggregated content from one or more third party webpages. For example, a drag and drop tool may be manipulated by a user to select particular content that has been previously stored or aggregated.

Block 2404 is followed by block 2406, in which an indication of a selected interface position is received for at least a portion of the selected content. In the embodiment shown in FIG. 24, the processor such as 114 in FIG. 1 and/or the curating application program such as 120 can receive an indication from an input device, such as a mouse or touch screen, that a user has selected a particular interface position for selected content from one or more third party webpages.

In one aspect of an embodiment, receiving an indication that content from one or more of the third party webpages has been selected, and receiving an indication of a selected interface position for at least a portion of the selected content can be implemented by a drag and drop tool manipulated by a user.

Block 2406 is followed by block 2408, in which an interface is output with the portion of selected content in the selected interface position. In the embodiment shown in FIG. 24, the processor such as 114 in FIG. 1 and/or the curating application program such as 120 can output the portion of selected content in the selected interface position in a desired webpage or website.

In another aspect of an embodiment, the method can include facilitating publication of the portion of the selected content in the selected interface position to an online user.

The method 2400 ends after block 2408.

FIG. 25 illustrates another example method for curating content according to an embodiment of the invention. The method 2500 begins at block 2502.

In block 2502, aggregated content is browsed. In the embodiment shown in FIG. 25, a user can browse previously stored or aggregated content using a curating application program, such as 120 in FIG. 1, operating alone or in conjunction with a browser application program, such as 118.

In one aspect of an embodiment, browsing aggregated content is performed in a first browser application window, and viewing the selected content in the desired interface position is performed in a second browser application window Block 2502 is followed by block 2504, in which a portion of the aggregated content is selected. In the embodiment shown in FIG. 25, the user can select previously stored or aggregated content using the curating application program, such as 120 in FIG. 1, operating alone or in conjunction with a browser application program, such as 118.

In one aspect of an embodiment, selecting a portion of the aggregated content and selecting a desired interface position for the selected content are performed using a drag and drop tool.

Block 2504 is followed by block 2506, in which a desired interface position is selected for the selected content. In the embodiment shown in FIG. 25, the user can select a desired interface position for the selected previously stored or aggregated content using the curating application program, such as 120 in FIG. 1, operating alone or in conjunction with a browser application program, such as 118.

Block 2506 is followed by block 2508, in which the selected content is viewed in the desired interface position. In the embodiment shown in FIG. 25, the user can view the selected previously stored or aggregated content in the desired interface position using the curating application program, such as 120 in FIG. 1, operating alone or in conjunction with a browser application program, such as 118.

Block 2508 is followed by block 2510, in which a webpage is published with the selected content in the selected interface position. In the embodiment shown in FIG. 25, the user can publish a webpage with the selected previously stored or aggregated content in the desired interface position using the curating application program, such as 120 in FIG. 1, operating alone or in conjunction with a browser application program, such as 118.

The method 2500 ends after block 2510.

FIG. 26 illustrates an example method for rating content according to an embodiment of the invention. The method 2600 begins at block 2602.

In block 2602, a set of indicators is provided for a user to rate at least a portion of aggregated content for audience appropriateness. In the embodiment shown in FIG. 26, a rating application program, such as 122, can provide a set of indicators is provided for a user to rate at least a portion of aggregated content for audience appropriateness.

In one aspect of an embodiment, the set of indicators can include at least one of the following ratings: G, PG, PG-13, R, NC-17, all ages, parental guidance may be needed, not recommended for a younger audience, restricted to an older audience, adults only, E, EC, E10+, T, M, AO, RP, any motion picture rating certification, any entertainment software rating board certification, or any other media rating.

Block 2602 is followed by block 2604, in which a plurality of rating indications is received from a respective plurality of users for the portion of aggregated content. In the embodiment shown in FIG. 26, the rating application program, such as 122, can receive a plurality of rating indications is received from a respective plurality of users for the portion of aggregated content.

Block 2604 is followed by block 2606, in which the received plurality of rating indications is aggregated. In the embodiment shown in FIG. 26, the rating application program, such as 122, aggregates the received plurality of rating indications.

Block 2606 is followed by block 2608, in which a rating is determined for the portion of aggregated content based at least in part on the aggregated rating indications. In the embodiment shown in FIG. 26, the rating application program, such as 122, can determine a rating for the portion of aggregated content based at least in part on the aggregated rating indications.

Block 2608 is followed by block 2610, in which the rating is output for the portion of aggregated content. In the embodiment shown in FIG. 26, the rating application program, such as 122, can output the rating for the portion of aggregated content.

In one aspect of an embodiment, the method can include receiving an indication from another user selecting the portion of aggregated content based at least in part on the rating of the portion of aggregated content.

The method 2600 of FIG. 26 ends after block 2610.

FIG. 27 illustrates another example method for rating content according to an embodiment of the invention. The method 2700 begins at block 2702.

In block 2702, a set of indicators is received for a user to rate at least a portion of the aggregated content for audience appropriateness. In the embodiment shown in FIG. 27, a user can receive a set of indicators to rate at least a portion of the aggregated content for audience appropriateness using a rating application program, such as 122 in FIG. 1, operating alone or in conjunction with a browser application program, such as 118.

Block 2702 is followed by block 2704, in which at least one indicator is selected to rate the portion of aggregated content. In the embodiment shown in FIG. 27, the user can select at least one indicator to rate the portion of aggregated content using the rating application program, such as 122 in FIG. 1, operating alone or in conjunction with a browser application program, such as 118.

Block 2704 is followed by block 2706, in which an aggregated rating is received for the portion of aggregated content. In the embodiment shown in FIG. 27, the user can receive an aggregated rating for the portion of aggregated content using the rating application program, such as 122 in FIG. 1, operating alone or in conjunction with a browser application program, such as 118.

The method 2700 ends after block 2706.

FIG. 28 illustrates yet another example method for rating content according to an embodiment of the invention. The method 2800 begins at block 2802.

In block 2802, a set of indicators is received for rating at least a portion of the aggregated content for audience appropriateness. In the embodiment shown in FIG. 25, a user can receive a set of indicators for rating at least a portion of the aggregated content for audience appropriateness using a rating application program, such as 122 in FIG. 1, operating alone or in conjunction with a browser application program, such as 118.

Block 2802 is followed by block 2804, in which at least one of the indicators is selected to filter the portion of aggregated content. In the embodiment shown in FIG. 25, the user can select at least one of the indicators to filter the portion of aggregated content using the rating application program, such as 122 in FIG. 1, operating alone or in conjunction with a browser application program, such as 118.

Block 2804 is followed by block 2806, in which at least some of the filtered portion of the aggregated content is output. In the embodiment shown in FIG. 28, the user can filter at least some of the aggregated content using the rating application program, such as 122 in FIG. 1, operating alone or in conjunction with a browser application program, such as 118.

The method 2800 ends after block 2806.

FIG. 29 illustrates an example method for providing or otherwise presenting content according to an embodiment of the invention. The method 2900 begins at block 2902.

In block 2902, content is aggregated from one or more third party webpages. In the embodiment shown in FIG. 29, a curating application program, such as 120 in FIG. 1, operating alone or in conjunction with a browser application program, such as 118, can aggregate content from one or more third party webpages and/or websites, such as content 126A, 126B on webpages 124A, 124B.

Block 2902 is followed by block 2904, in which at least a portion of the aggregated content is stored. In the embodiment shown in FIG. 29, the curating application program, such as 120 in FIG. 1, operating alone or in conjunction with a browser application program, such as 118, can store at least a portion of the aggregated content in one or more data storage devices, such as a memory 144 and/or database 160-170.

In one aspect of an embodiment, the aggregated content can be normalized and cleansed.

In one aspect of an embodiment, storing at least a portion of the content in at least one data storage device can include receiving authorization to store the portion of the content.

Block 2904 is followed by block 2906, in which a user is provided with access to the stored portion of content when the user requests, via a browser program, a selection of content from the one or more third party webpages. In the embodiment shown in FIG. 29, the curating application program, such as 120 in FIG. 1, operating alone or in conjunction with a browser application program, such as 118, can provide access to the stored portion of content when the user requests, via a browser program, a selection of content from the one or more third party webpages. For example, using proxy functionality, the curating application program, such as 120 in FIG. 1, operating alone or in conjunction with a browser application program, such as 118, can facilitate access for the user to browse original third party content on a third party website and/or webpage. When the user selects the original third party content for use in a webpage and/or website, the curating application program, such as 120, can obtain or otherwise access previously stored, corresponding content from a data storage device, such as memory 144 or database 160-170, and provide the previously stored, corresponding content in response to the user's request.

In one aspect of an embodiment, user browsing of content from the one or more third party websites can be facilitated, wherein the user can indicate the selection of content from the one or more third party websites.

In one aspect of an embodiment, the stored portion of content can be output to the user via the browser program.

In one aspect of an embodiment, the method can include generating a template for the user to view content; and outputting the stored portion of content in the template, wherein the user can view the stored portion of content.

The method 2900 ends after block 2906.

Embodiments of the example methods, processes, and data flows shown in FIGS. 2-29 can be implemented with either or both a curating application program, such as 120 in FIG. 1, and rating application program, such as 122, according to embodiments of the invention, as well as with certain components of the systems described in co-pending U.S. application Ser. Nos. 12/367,968 and 12/647,304. The example embodiments of FIGS. 2-29 can have fewer or greater numbers of elements according to other embodiments of the invention.

Embodiments of the invention are described above with reference to block diagrams and flowchart illustrations of systems, methods, apparatuses and computer program products. It will be understood that some or all of the blocks of the block diagrams and flowchart illustrations, and combinations of blocks in the block diagrams and flowchart illustrations, respectively, can be implemented by computer program instructions. These computer program instructions may be loaded onto a general purpose computer, special purpose computer such as a switch, or other programmable data processing apparatus to produce a machine, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data-processing apparatus to cause a series of operational elements or steps to be performed on the computer or other programmable apparatus to produce a computer-implemented process such that the instructions that execute on the computer or other programmable apparatus provide elements or steps for implementing the functions specified in the flowchart block or blocks.

Accordingly, blocks of the block diagrams and flowchart illustrations may support combinations of means for performing the specified functions, combinations of elements for performing the specified functions, and program instruction means for performing the specified functions. It will also be understood that some or all of the blocks of the block diagrams and flowchart illustrations, and combinations of blocks in the block diagrams and flowchart illustrations, can be implemented by special purpose hardware-based computer systems that perform the specified functions, elements, or combinations of special purpose hardware and computer instructions.

Additionally, it is to be recognized that, while the invention has been described above in terms of one or more embodiments, it is not limited thereto. Various features and aspects of the above described invention may be used individually or jointly. Although the invention has been described in the context of its implementation in a particular environment and for particular purposes, its usefulness is not limited thereto and the invention can be beneficially utilized in any number of environments and implementations. Furthermore, while the methods have been described as occurring in a specific sequence, it is appreciated that the order of performing the methods is not limited to that illustrated and described herein, and that not every element described and illustrated need be performed. Accordingly, the claims set forth below should be construed in view of the full breadth of the embodiments as disclosed herein.

The claimed invention is:

1. A method comprising:
aggregating, by a processor, a plurality of candidate recommended content from a plurality of third party webpages in accordance with authorization received from the plurality of third party webpages;
receiving, from a user managing publication of a webpage, information identifying first content, wherein the first content is positioned in a first position of the webpage;
providing an editing interface for the user to select a first block-specific configuration parameter to filter recommended content to be displayed in a first recommendation block of the webpage;
receiving, via the editing interface, the first block-specific configuration parameter, wherein the first block-specific configuration parameter comprises at least one of a maximum age of recommended content that can be displayed in the first recommendation block or a maximum number of times recommended content displayed in the first recommendation block can be viewed;
filtering, by the processor, a first set of recommended content from the plurality of candidate recommended content that satisfy a minimum level of relatedness to the first content and satisfy the first block-specific configuration parameter associated with the first recommendation block of the webpage;
receiving, via the editing interface, a first selection of a first recommended content from the first set of recommended content, the first recommended content to be positioned at a first slot of the first recommendation block;
receiving a first priority command corresponding to the first recommended content, wherein the first priority command indicates a first priority weight assigned to the first recommended content;
storing the first selection and the first priority weight in a data store;
in response to a request for recommended content for display at the first slot of the first recommendation block of the webpage, identifying, from the data store, the first recommended content and second recommended content, wherein the first recommended content and the second recommended content satisfy the minimum level of relatedness to the first content and satisfy the first block-specific configuration parameter;
comparing the first priority weight associated with the first recommended content and a second priority weight associated with the second recommended content;
determining, based on the comparing, the first priority weight is greater than the second priority weight; and
facilitating authorized display to a first online user of the first content at the first position of the webpage and the first recommended content at the first recommendation block of the webpage.

2. The method of claim 1, wherein aggregating the plurality of candidate recommended content from the plurality of third party webpages comprises at least one of: storing the candidate recommended content from the plurality of third party webpages in at least one data storage device, storing a plurality of URLs associated with the plurality of third party webpages in at least one data storage device, or facilitating access to the plurality of candidate recommended content from the plurality of third party webpages via at least one proxy tool.

3. The method of claim 1, further comprising:
searching the aggregated plurality of candidate recommended content based on user input.

4. The method of claim 1, further comprising:
receiving, via the editing interface, input to select the first recommended content based at least in part on at least one of a keyword, a consumer preference, a consumer-related rating, or consumer popularity.

5. The method of claim 1, further comprising:
receiving a filter indicating at least one of an exclusion of a portion of the plurality of candidate recommended content, an exclusion duration for a portion of the plurality of candidate recommended content, a publication time for a portion of the plurality of candidate recommended content, or a number of webpages to populate with a portion of the plurality of candidate recommended content.

6. A system comprising:
at least one data storage device to store a plurality of third party webpages;
processor device operatively coupled to the at least one data store device to:
aggregate a plurality of candidate recommended content from a plurality of third party webpages in accordance with authorization received from the plurality of third party webpages;
receive, from a user managing publication of a webpage, information identifying first content, wherein the first content is positioned in a first position of the webpage;
provide an editing interface for the user to select a first block-specific configuration parameter to filter recommended content to be displayed in a first recommendation block of the webpage;
receive, via the editing tool, the first block-specific configuration parameter, wherein the first block-specific configuration parameter comprises at least one of a maximum age of recommended content that can be displayed in the first recommendation block or a maximum number of times recommended content displayed in the first recommendation block can be viewed;
filter a first set of recommended content from the plurality of candidate recommended content that satisfy a minimum level of relatedness to the first content and satisfy the first block-specific configuration parameter associated with the first recommendation block of the webpage;
receive, via the editing interface, a first selection of a first recommended content from the first set of recommended content, the first recommended content to be positioned at a first slot of the first recommendation block;
receive a first priority command corresponding to the first recommended content, wherein the first priority command indicates a first priority weight assigned to the first recommended content;
store the first selection and the first priority weight in a data store;
in response to a request for recommended content for display at the first slot of the first recommendation block of the webpage, identify, from the data store, the first recommended content and second recommended content, wherein the first recommended content and the second recommended content satisfy the minimum level of relatedness to the first content and satisfy the first block-specific configuration parameter;
compare the first priority weight associated with the first recommended content and a second priority weight associated with the second recommended content;
determine the first priority weight is greater than the second priority weight; and
facilitate authorized display to a first online user of the first content at the first position of the webpage and the first recommended content at the first recommendation block of the webpage.

7. The system of claim 6, the processor to cause at least one of:
the plurality of candidate recommended content from the plurality of third party webpages to be stored in at least one data storage device,
a plurality of URLs associated with the plurality of third party webpages to be stored in at least one data storage device, or
access to the plurality of candidate recommended content from the plurality of third party webpages via at least one proxy tool.

8. The system of claim 6, the processor to:
search the aggregated plurality of candidate recommended content based on user input.

9. The system of claim 6, wherein the processor device is further to:
provide a content filter tool to receive input to filter the one or more of the plurality of recommended content based at least in part on at least one of a keyword, a consumer preference, a consumer-related rating, or consumer popularity.

10. A non-transitory computer readable storage medium comprising instructions that, if executed by a processor device, cause the processor to:
aggregate a plurality of candidate recommended content from a plurality of third party webpages in accordance with authorization received from the plurality of third party webpages;
receive, from a user managing publication of a webpage, information identifying first content, wherein the first content is positioned in a first position of the webpage;
provide an editing interface for the user to select a first block-specific configuration parameter to filter recommended content to be displayed in a first recommendation block of the webpage;
receive, via the editing tool, the first block-specific configuration parameter, wherein the first block-specific configuration parameter comprises at least one of a maximum age of recommended content that can be displayed in the first recommendation block or a maximum number of times recommended content displayed in the first recommendation block can be viewed;
filter a first set of recommended content from the plurality of candidate recommended content that satisfy a minimum level of relatedness to the first content and satisfy the first block-specific configuration parameter associated with the first recommendation block of the webpage;

receive, via the editing interface, a first selection of a first recommended content from the first set of recommended content, the first recommended content to be positioned at a first slot of the first recommendation block;

receive a first priority command corresponding to the first recommended content, wherein the first priority command indicates a first priority weight assigned to the first recommended content;

store the first selection and the first priority weight in a data store;

in response to a request for recommended content for display at the first slot of the first recommendation block of the webpage, identify, from the data store, the first recommended content and second recommended content, wherein the first recommended content and the second recommended content satisfy the minimum level of relatedness to the first content and satisfy the first block-specific configuration parameter;

compare the first priority weight associated with the first recommended content and a second priority weight associated with the second recommended content;

determine the first priority weight is greater than the second priority weight; and facilitate authorized display to a first online user of the first content at the first position of the webpage and the first recommended content at the first recommendation block of the webpage.

* * * * *